US 6,707,846 B1

(12) United States Patent
Iwamatsu

(10) Patent No.: US 6,707,846 B1
(45) Date of Patent: Mar. 16, 2004

(54) CORRELATION ENERGY DETECTOR AND RADIO COMMUNICATION APPARATUS

(75) Inventor: Takanori Iwamatsu, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/543,302

(22) Filed: Apr. 5, 2000

(30) Foreign Application Priority Data

Jul. 12, 1999 (JP) .......................................... 11-197270

(51) Int. Cl.[7] ................................................ H04B 1/69
(52) U.S. Cl. .................................... 375/150; 375/142
(58) Field of Search ............................... 375/130, 136, 375/137, 349, 142, 143, 145, 148, 149, 150, 347; 370/320, 335, 342, 441, 445; 455/132, 137

(56) References Cited

U.S. PATENT DOCUMENTS

| | | | | |
|---|---|---|---|---|
| 4,730,340 A | * | 3/1988 | Frazier, Jr. .................. 375/207 |
| 5,646,958 A | * | 7/1997 | Tsujimoto ................... 375/233 |
| 5,751,624 A | | 5/1998 | Zhou et al. |
| 5,910,948 A | * | 6/1999 | Shou et al. .................. 370/335 |
| 6,067,315 A | * | 5/2000 | Sandin ........................ 375/206 |
| 6,154,487 A | * | 11/2000 | Murai et al. ................. 375/150 |
| 6,188,682 B1 | * | 2/2001 | Takagi et al. ............... 370/342 |
| 6,208,291 B1 | * | 3/2001 | Krasner ................... 342/357.12 |
| 6,229,840 B1 | * | 5/2001 | Ichihara ...................... 375/147 |
| 6,246,714 B1 | * | 6/2001 | Okamoto .................... 375/142 |
| 6,424,138 B1 | * | 7/2002 | Brownstein .............. 324/76.24 |
| 6,426,978 B1 | * | 7/2002 | Bottomley et al. ......... 341/143 |
| 6,430,212 B1 | * | 8/2002 | Alisobhani et al. ......... 375/141 |
| 6,434,185 B1 | * | 8/2002 | Struhsaker et al. ......... 375/142 |
| 6,438,183 B1 | * | 8/2002 | Taura et al. ................ 375/326 |
| 6,487,260 B1 | * | 11/2002 | Schweickert et al. ....... 375/343 |

FOREIGN PATENT DOCUMENTS

| | | |
|---|---|---|
| EP | 0 911 990 | 4/1999 |
| JP | 09-097299 | 4/1997 |
| JP | 10-215211 | 8/1998 |
| JP | 10-303856 | 11/1998 |
| JP | 11-127132 | 5/1999 |
| WO | 98/26519 | 6/1998 |

OTHER PUBLICATIONS

Filip, "A Baker's Dozen Magnitude Approximation and Their Detection Statistics" IEEE Trans. Aerospace and Electronic Systems Jan. 12, 1976. pp. 86–89.

* cited by examiner

*Primary Examiner*—Emmanuel Bayard
(74) *Attorney, Agent, or Firm*—Katten Munich Zavis Rosenman

(57) ABSTRACT

A correlation energy detector detects a magnitude of a correlation between a first signal series ($I_i$, $Q_i$) described by I-Q orthogonal components and a predetermined second signal series ($H_j$). The correlation energy detector includes a correlation computing section for computing correlation values ($I_{ij}$, $Q_{ij}$) between the first signal series ($I_i$, $Q_i$) and the predetermined second signal series ($H_j$), and a root computing section for computing $\{\sqrt{(I_{ij}^2+Q_{ij}^2)}\}$ as a root value of a sum of squares of the correlation values ($I_{ij}$, $Q_{ij}$) obtained from the correlation computing section.

4 Claims, 25 Drawing Sheets

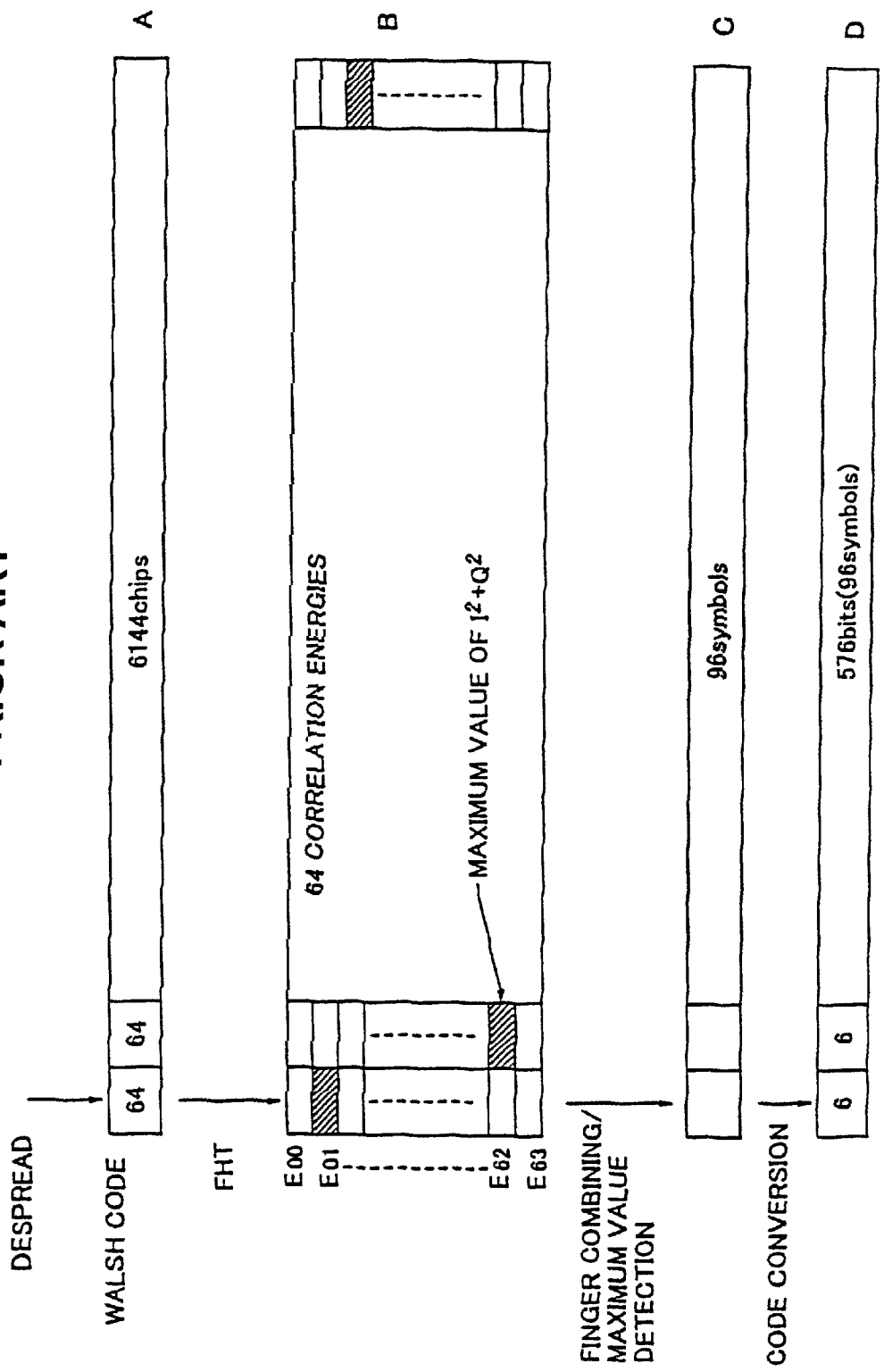

US 6,707,846 B1

CORRELATION ENERGY DETECTOR AND RADIO COMMUNICATION APPARATUS

BACKGROUND OF THE INVENTION

1. Field of the Invention

The present invention generally relates to correlation energy detectors and radio communication apparatuses, and more particularly to a correlation energy detector for detecting a magnitude of a correlation between a first signal series (Ii, Qi) described by I-Q orthogonal components and a predetermined second signal series ($H_j$), and to a radio communication apparatus which uses such a correlation energy detector.

The code division multiple access (CDMA) system is regarded as a mobile communication system of the next generation, and in the United States, a standardized system (N-CDMA) called IS-95 is already reduced to practice. In addition, there is a possibility of the CDMA system being applied to a semi-fixed mobile communication system called wireless local loop (WLL) as a means of infra-structure. Such a system proposed by Qualcomm of the United States is a CDMA system using a chip rate of 1.2288 Mcs, wherein a synchronous detection system using an extrapolated pilot signal is employed for the down-line, and an asynchronous detection system using the M-ary orthogonal modulation is employed for the up-line (reverse link). In the asynchronous detection system, an amplitude signal is converted into power so as to eliminate a phase error caused by fading or the like, and the communication quality or bit error rate (BER) is improved by employing the RAKE reception technique. The present invention, as will be described later, is suited for application to this kind of radio communication apparatus (reverse link).

2. Description of the Related Art

FIGS. 1 through 7, FIGS. 8A through 8C and FIG. 9 are diagrams for explaining the prior art, more particularly, the standardized system IS-95. FIG. 1 is a system block diagram showing a transmitter part of a mobile station, and FIG. 2 is a diagram showing a signal sequence of the transmitter part. Signals (A) through (E) shown in FIG. 2 are the signals (A) through (E) shown in FIG. 1.

An input information signal is subjected to a cyclic coding in a CRC operation unit 11, and is converted into an error correction code in a convolutional encoder (ENC) 12. This error correction code is subjected to an identical symbol repeating process in a symbol repeating unit 13, so as to unify the input signals in the range of 1.2 kbps to 9.6 kbps to the signal (A) of 9.6 kbps. The signal (A) is further subjected to a buffering process in an interleaver 14. A signal sequence (B) of 28.8 kbps is read from the interleaver 14 and input to an M-ary (64) orthogonal modulator 15.

The 64-ary orthogonal modulator 15 converts the 6-bit input data to a corresponding 64-bit Walsh code (C), that is, spreads the input data by 64/6 times. For example, the 6-bit input data "000000" is converted into a 64-bit Walsh code "00000000 . . . 00000000", and the 6-bit input data "000001" is converted into a 64-bit Walsh code "01010101 . . . 01010101". Such Walsh codes (C) are finally output from the 64-ary orthogonal modulator 15 as a signal (D) of 307.2 kcps.

A multiplier 17 multiplies to the signal (D) a PN code (user code or long code) LCD which is generated for each user by a long code generator 16. As a result, a spread code sequence (E) of 1.2288 Mcps is output from the multiplier 17 and is supplied to a multiplier $20_1$ provided for the I-channel and a multiplier $20_2$ provided for the Q-channel. The multiplier $20_1$ multiplies to the spread code sequence (E) a PN code (short code) SCD for identifying the base station, which is generated from a short code generator 18 and is received via a shifter 19. On the other hand, the multiplier $20_2$ multiplies to the spread code sequence (E) the PN code SCD which is generated from the short code generator 18.

An output of the multiplier $20_1$ is passed through a filter $22_1$ and a digital-to-analog (D/A) converter $23_1$ and converted into an analog signal before being supplied to a quadrature phase shift keying (QPSK) modulator 24. An output of the multiplier $20_2$ is passed through a ½ chip delay unit 21, a filter $22_2$ and a D/A converter $23_2$ and converted into an analog signal before being supplied to the QPSK modulator 24.

Since the ½ chip delay unit 21 provides a ½ chip shift between the I-channel and the Q-channel, an output of the QPSK modulator 24 becomes an offset QPSK (OQPSK) modulated signal. By this OQPSK modulation, no phase change of π occurs, and the phase change becomes π/2 at the maximum. For this reason, even under an extreme band limitation, the signal envelope only dips slightly, and no zero-point occurs. An OQPSK modulated signal output from the QPSK modulator 24 is converted into a radio frequency signal in a transmitting radio frequency (RF) unit (Tx) 25 and is transmitted to the base station via an antenna A0.

FIG. 3 is a system block diagram showing a receiver part (reverse link demodulator part) of the base station. In addition, FIG. 4 is a diagram for explaining a service area of the base station, and FIG. 5 is a diagram for explaining asynchronous detection. Further, FIG. 6 is a system block diagram showing fingers forming the receiver part, and FIG. 7 is a diagram showing a signal sequence of the receiver part.

As shown in FIG. 4, 1 cell is divided into 3 sectors, and 2 reception (diversity) antennas are provided with respect to 1 sector. A maximum number of antennas capable of simultaneously communicating with a mobile station MS which is located at an arbitrary position is 4, namely, A11, A12, A21 and A22, in this particular case. Hence, 4 corresponding antennas A1 through A4 are shown in FIG. 3.

In FIG. 3, the received signals from the antennas A1 through A4 are amplified and converted into intermediate frequency signals IF in corresponding receiving RF units (Rx) $31_1$ through $31_4$, and demodulated into orthogonal demodulated data (I1, Q1) through (I4, Q4) in corresponding QPSK demodulators (DEM) $32_1$ through $32_4$. The orthogonal demodulated data (I1, Q1) through (I4, Q4) are selected by a signal selector 33 which operates under the control of a searcher 40, and input to fingers $34_1$ through $34_4$. In this state, the received wave is not necessarily supplied constantly to each finger, and each finger operates under conditions, such as antenna selection and delay time $PN_{offset}$, which are specified by the searcher. Hence, various combinations are actually permitted for the connection of the QPSK demodulators $32_1$ through $32_4$ and the fingers $34_1$ through $34_4$.

FIG. 6 shows the construction of the fingers $34_1$ through $34_4$. In a despreader 41 of the finger $34_1$, the input demodulated data I1, Q1 are respectively despread by a correlator 42 based on the short code $PN_{offset}$ (PNI1, PNQ1) supplied from the searcher 40. The short codes PNI1, PNQ1 correspond to the short code SCD of the transmitter end, and PNI1 is phase (chip) synchronized to the demodulated data I1 while PNQ1 is phase (chip) synchronized to the demodulated data Q1. Further, output data I1, Q1 of the correlator 40 are despread by corresponding multipliers $43_1$ and $43_2$ based on a long code LCD corresponding to the user code LCD of the transmitting end. In addition, an adder $44_1$ adds 4 consecutive despread codes I1 from the multipliers $43_1$, and an adder $44_2$ adds 4 consecutive despread codes Q1 from the multiplier $43_2$.

If no chip error occurs during the transmission, output data I1, Q1, that is, (A) shown in FIG. 7, of the adders $44_1$ and $44_2$ correspond to the output Walsh code of the 64-ary orthogonal modulator 15 of the transmitting end. Actually, however, the output data I1, Q1 (A) of the adders $44_1$ and $44_2$ do not necessarily correspond to the output Walsh code of the 64-ary orthogonal modulator 15 due to the chip error or the like introduced during the transmission.

The output data I1, Q1 (A) of the adders $44_1$ and $44_2$ are subjected to the Hadamard transform in corresponding fast Hadamard transform units (FHT) $45_1$ and $45_2$. In other words, the input data I1, Q1 and 64 kinds of Walsh code sequences are subjected to matrix operations, so that correlation values ($I_{00}$ through $I_{63}$), ($Q_{00}$ through $Q_{63}$) are generated depending on the correlation of the codes. Energy calculation units $46_{00}$ through $46_{63}$ obtain powers ($I_{00}^2 + Q_{00}^2$) through ($I_{63}^2 + Q_{63}^2$) for each of the correlation values, and output correlation energies $E_{00}$ through $E_{63}$ corresponding to Walsh code numbers 0 through 63.

The correlation energies $E_{00}$ through $E_{63}$ are input to a gate circuit 47 and to a maximum value selector (MXS) 48. The maximum value selector 48 selects a maximum correlation energy MXE from the correlation energies $E_{00}$ through $E_{63}$. A comparator (CMP) 49 compares the maximum correlation energy MXE and a predetermined threshold value TH, and closes the gate circuit 47 when MXE>TH and otherwise opens the gate circuit 47. In other words, the output correlation energies $E_{00}$ through $E_{63}$ of the energy calculation units $46_{00}$ through $46_{63}$ are output from the finger $34_1$ and contribute to the RAKE combining at the latter stage only when the maximum energy MXE exceeds the predetermined threshold value TH. Similar operations are carried out in the other fingers $34_2$ through $34_4$. Under the RAKE reception system, the correlation value level is made large by combining only the correlation value outputs from the valid fingers of each of the correlation value outputs (energies) of the multi-path which includes 4 paths at the maximum in FIG. 3, so as to increase the certainty of the correlation value.

Returning now to the description of FIG. 3, the output correlation energies $E_{00}$ through $E_{63}$ from the fingers $34_1$ through $34_4$ are combined (added) for each of the correlation energies $E_{00}$ through $E_{63}$ in the combining units $35_{00}$ through $35_{63}$, and combined energies $G_{00}$ through $G_{63}$ are output from the combining units $35_{00}$ through $35_{63}$. A maximum value selector 36 selects a maximum combined energy MXG of the combined energies $G_{00}$ through $G_{63}$, and demodulates a Walsh code (number) MXW corresponding to this maximum combined energy MXG.

Under the asynchronous detection system, the phase component is eliminated by converting the demodulated signals I, Q into power ($I^2+Q^2$), so as to prevent phase noise caused by fading and to prevent deterioration of a local signal caused by frequency error. FIG. 5 is a diagram for explaining the asynchronous detection in this state. Even if the demodulated phase changes (rotates) by $\Delta\phi$ between timings t1 and t2, the maximum combined energy MXG= $G_{15}$ is obtained at the timing t1, and the maximum combined energy MXG=$G_{32}$ is obtained at the timing t2.

The Walsh code MXW, that is, (C) shown in FIG. 7, is converted into a corresponding 6-bit data, that is, (D) shown in FIG. 7, by a code converter 37, deinterleaved in a deinterleaver 38, subjected to a Viterbi decoding (error correction decoding) in a Viterbi decoder 39, and output as received data RD.

According to the conventional system described above, the finger locked state occurs when MXE>TH as a result of the comparison of the maximum combined energy MXE of the combined energies $G_{00}$ through $G_{63}$ and the predetermined threshold value TH.

FIG. 8A is a diagram showing an example of a correlation energy versus Eb/No characteristic. In FIG. 8A, the ordinate indicates the correlation energy, and the abscissa indicates Eb/No, that is, the signal-to-noise (S/N) ratio per bit. Generally, the correlation energy is high when Eb/No (reception quality) is high, and the correlation energy decreases when Eb/No decreases, as will be described hereunder.

FIG. 8B is a diagram showing an example of a case where Eb/No is sufficiently high. In FIG. 8B, the ordinate indicates the correlation energy, and the abscissa indicates energy types $E_{00}$ through $E_{63}$ corresponding to the Walsh code numbers $W_{00}$ through $W_{63}$. If Eb/No (communication quality) is sufficiently high and the Walsh code $W_{15}$ sent from the transmitting end is correctly demodulated into the code $W_{15}$ at the receiving end, the correlation energy $E_{15}$ becomes MXE at the maximum, and the other correlation energies all become "0". Accordingly, the conventional system can judge whether or not XXE>TH.

FIG. 8C is a diagram showing an example of a case where Eb/No decreases. In FIG. 8B, the ordinate indicates the correlation energy, and the abscissa indicates energy types $E_{00}$ through $E_{63}$ corresponding to the Walsh code numbers $W_{00}$ through $W_{63}$. If Eb/No (communication quality) decreases, burst error or the like mixes into the Walsh code $W_{15}$ sent from the transmitting end, and the correlation energy $E_{15}$ decreases in a received code $W_{15}'$ which includes error and is demodulated at the receiving end. As a result, the correlation energy increases in relation to the other codes, and in the conventional system it is impossible to detect whether or not $E_{15}$>TH, that is, whether or not the finger locked state occurs.

FIG. 9 is a system block diagram showing a conventional searcher. In FIG. 9, those parts which are the same as those corresponding parts in FIG. 6 are designated by the same reference numerals, and a description thereof will be omitted.

In the searcher 40 shown in FIG. 9, a search controller 73 controls the signal selector 33 shown in FIG. 3, so as to select the demodulated data Ii, Qi of the desired path. In addition, the search controller 73 instructs a desired delay time with respect to a delay time adjusting part 71 and a delay time $PN_{offset}$ with respect to a PN generator 74, so as to detect the maximum correlation energy MXE in this state, and detects (monitors) the path which satisfies such conditions. The construction of the despreader 41 and the structure within a correlation energy detector 72 may be the same as those described above with respect to the finger 34. However, no RAKE combining is made in the searcher 40, and thus, no combining of the finger outputs is made.

According to the conventional system, the correlation energy of the fingers are obtained in the form of a sum of squares ($I^2+Q^2$). However, the circuit scale of the multipliers for realizing the sum of squares operation is extremely large. In addition, the number of bits required to describe the correlation energy by the sum of squares is doubled as compared to normal, thereby making the circuit scale of subsequent circuit stages extremely large. Moreover, since the correlation value of the outputs of the fast Hadamard transform units (FHT) has a large dynamic range, it is difficult to reduce the number of bits without adverse effects. In other words, if the number of bits is reduced by rounding or limiting, the accuracy of the correlation value is directly affected. These problems exist not only in the main signal processing system such as the finger 34, but also in the searcher 40.

SUMMARY OF THE INVENTION

Accordingly, it is a general object to provide a novel and useful correlation energy detector and radio communication apparatus, in which the problems described above are eliminated.

Another and more specific object of the present invention is to provide a correlation energy detector and a radio communication apparatus which can appropriately detect the correlation energy and appropriately combine fingers (RAKE) using a relatively simple structure.

Still another object of the present invention is to provide a correlation energy detector for detecting a magnitude of a correlation between a first signal series (Ii, Qi) described by I-Q orthogonal components and a predetermined second signal series ($H_J$), comprising correlation computing means for computing correlation values ($I_{ij}$, $Q_{ij}$) between the first signal series (Ii, Qi) and the predetermined second signal series ($H_J$), and root computing means for computing {$\sqrt{(I_{ij}^2+Q_{ij}^2)}$} as a root value of a sum of squares of the correlation values ($I_{ij}$, $Q_{ij}$) obtained from the correlation computing means. According to the correlation energy detector of the present invention, the number of bits of the root of the sum-of-squares correlation energy is greatly reduced to approximately ½ as compared to that of the sum of squares correlation energy. For this reason, the wiring scale and the circuit scale of the subsequent circuit stages can be reduced considerably. Furthermore, the detection accuracy of the maximum energy and the accuracy of the combined energy are substantially unaffected by the correlation energy detection, and thus, appropriate detection of the correlation energy is possible using a simple structure.

A further object of the present invention is to provide a correlation energy detector for detecting a magnitude of a correlation between a first signal series (Ii, Qi) described by I-Q orthogonal components and a predetermined second signal series ($H_J$), comprising correlation computing means for computing correlation values ($I_{ij}$, $Q_{ij}$) between the first signal series (Ii, Qi) and the predetermined second signal series ($H_J$), and absolute value sum computing means for computing ($|I_{ij}|+|Q_{ij}|$) as a sum of absolute values of the correlation values ($I_{ij}$, $Q_{ij}$) obtained from the correlation computing means. According to the correlation energy detector of the present invention, the number of bits of the absolute value sum correlation energy is greatly reduced to approximately ½ as compared to that of the sum of squares correlation energy. For this reason, the wiring scale and the circuit scale of the subsequent circuit stages can be reduced considerably. In addition, it is unnecessary to provide multipliers which would be necessary if the sum of squares ($I_{ij}^2+Q_{ij}^2$) were to be computed, and the structure of the correlation energy detector can be made extremely simple from this point of view.

Another object of the present invention is to provide a radio communication apparatus which subjects each signal series which is described by I-Q orthogonal components and is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, wherein each finger includes a correlation energy detector so as to obtain the correlation values of the codes, the correlation energy detector detecting a magnitude of a correlation between a first signal series (Ii, Qi) described by I-Q orthogonal components and a predetermined second signal series ($H_J$), and comprising correlation computing means for computing correlation values ($I_{ij}$, $Q_{ij}$) between the first signal series (Ii, Qi) and the predetermined second signal series ($H_J$), and root computing means for computing {$\sqrt{(I_{ij}^2+Q_{ij}^2)}$} as a root value of a sum of squares of the correlation values ($I_{ij}$, $Q_{ij}$) obtained from the correlation computing means. According to the radio communication apparatus of the present invention, it is possible to simplify the structure of the apparatus by use of the correlation energy detector having a simple structure.

Still another object of the present invention is to provide a radio communication apparatus which subjects each signal series which is described by I-Q orthogonal components and is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, the radio communication apparatus comprising a searcher which monitors a reception state by obtaining the correlation values of the codes for each path, and performs a path selection and a delay time adjustment with respect to each finger, the searcher including a correlation energy detector so as to obtain the correlation values of the codes, the correlation energy detector detecting a magnitude of a correlation between a first signal series (Ii, Qi) described by I-Q orthogonal components and a predetermined second signal series ($H_J$), and comprising correlation computing means for computing correlation values ($I_{ij}$, $Q_{ij}$) between the first signal series (Ii, Qi) and the predetermined second signal series ($H_J$), and absolute value sum computing means for computing ($|I_{ij}|+|Q_{ij}|$) as a sum of absolute values of the correlation values ($I_{ij}$, $Q_{ij}$) obtained from the correlation computing means. According to the radio communication apparatus of the present invention, it is possible to simplify the structure of the apparatus by use of the correlation energy detector having a simple structure.

Other objects and further features of the present invention will be apparent from the following detailed description when read in conjunction with the accompanying drawings.

BRIEF DESCRIPTION OF THE DRAWINGS

FIG. 7 is a diagram showing a signal sequence of the receiver part;

DESCRIPTION OF THE PREFERRED EMBODIMENTS

First, a description will be given of the operating principle according to first and second aspects of the present invention.

Figure 1:
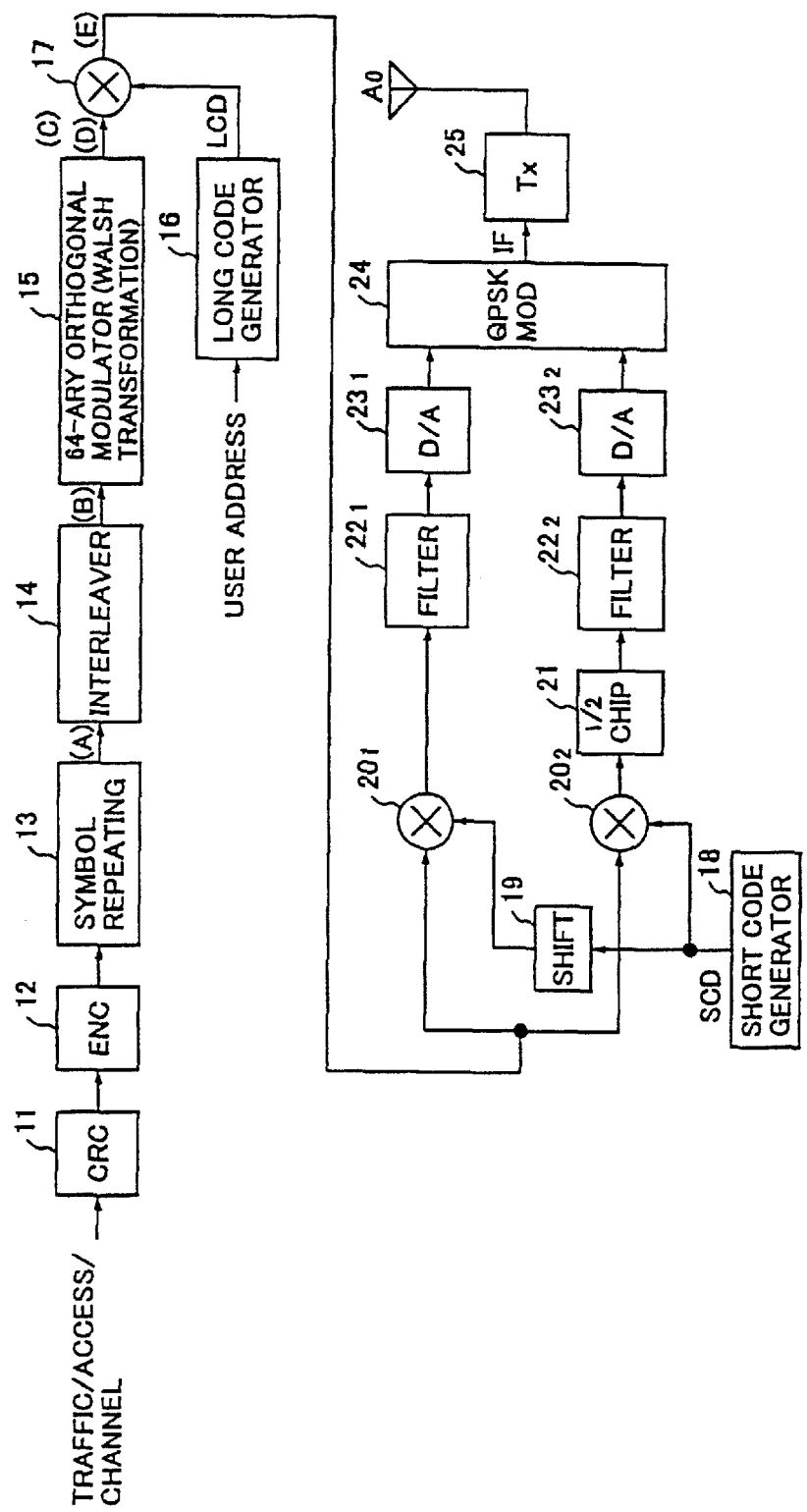
FIG. 1 is a system block diagram showing a transmitter part of a mobile station.
Figure 2:
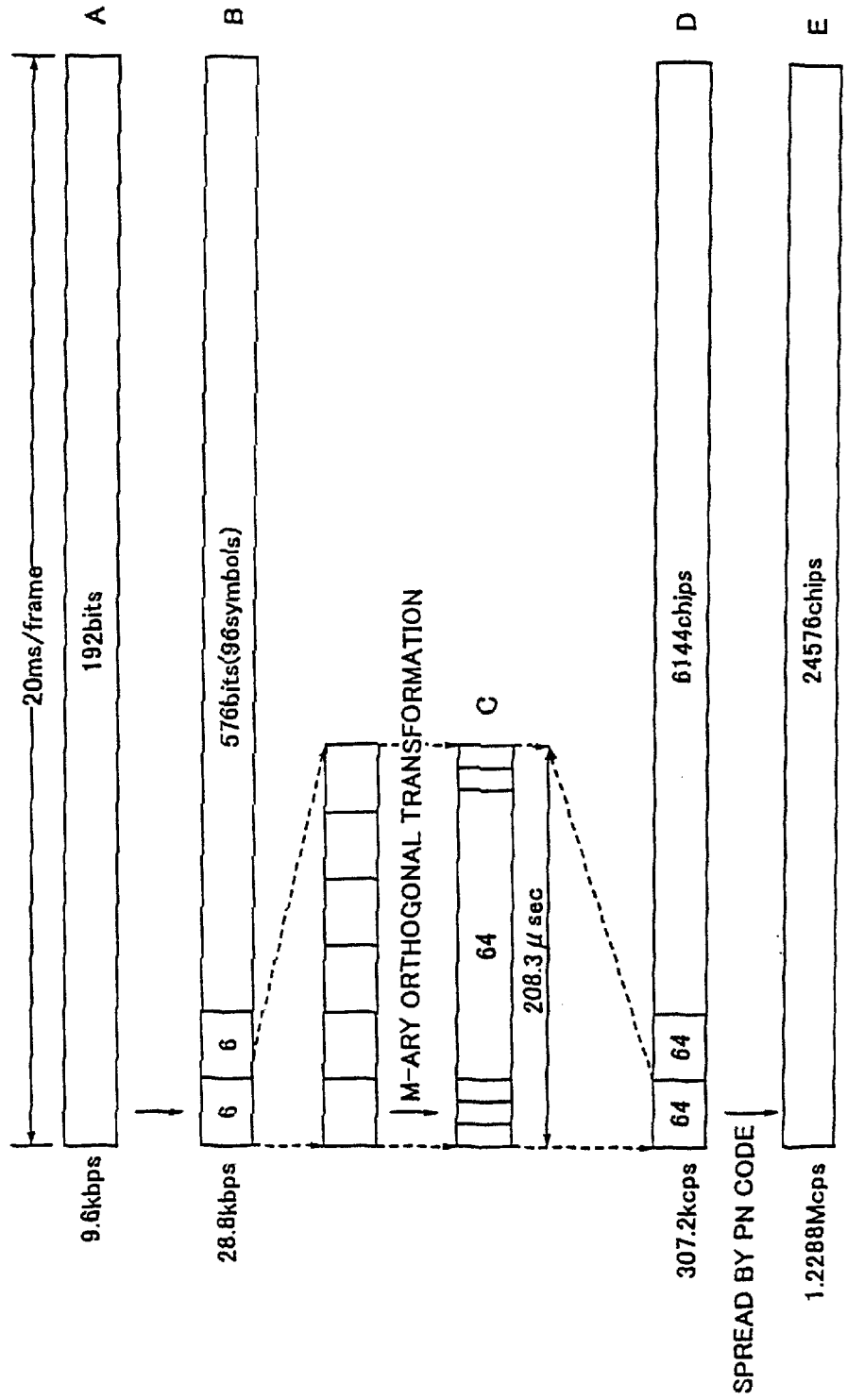
FIG. 2 is a diagram showing a signal sequence of the transmitter part.
Figure 3:
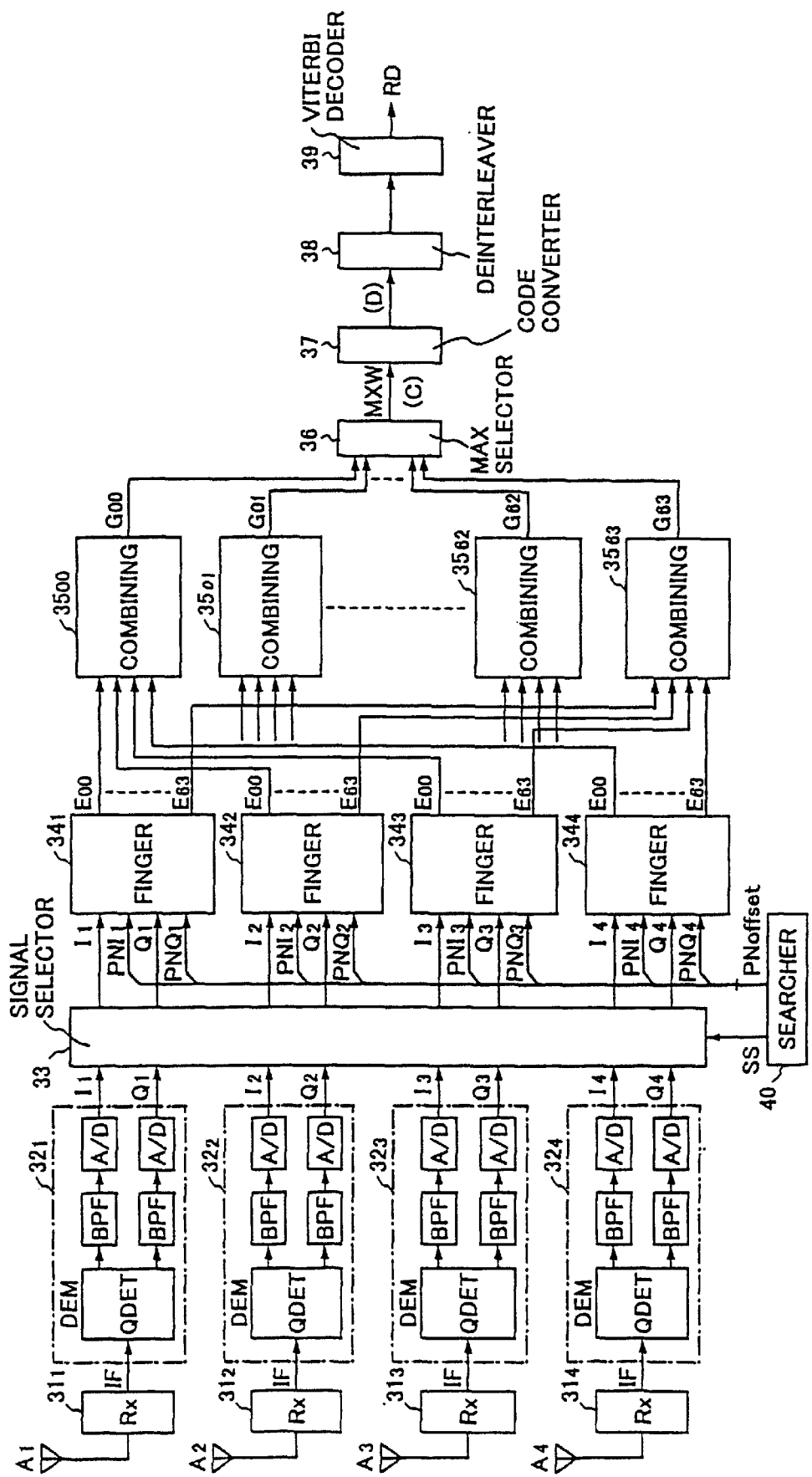
FIG. 3 is a system block diagram showing a receiver part of the base station.
Figure 4:
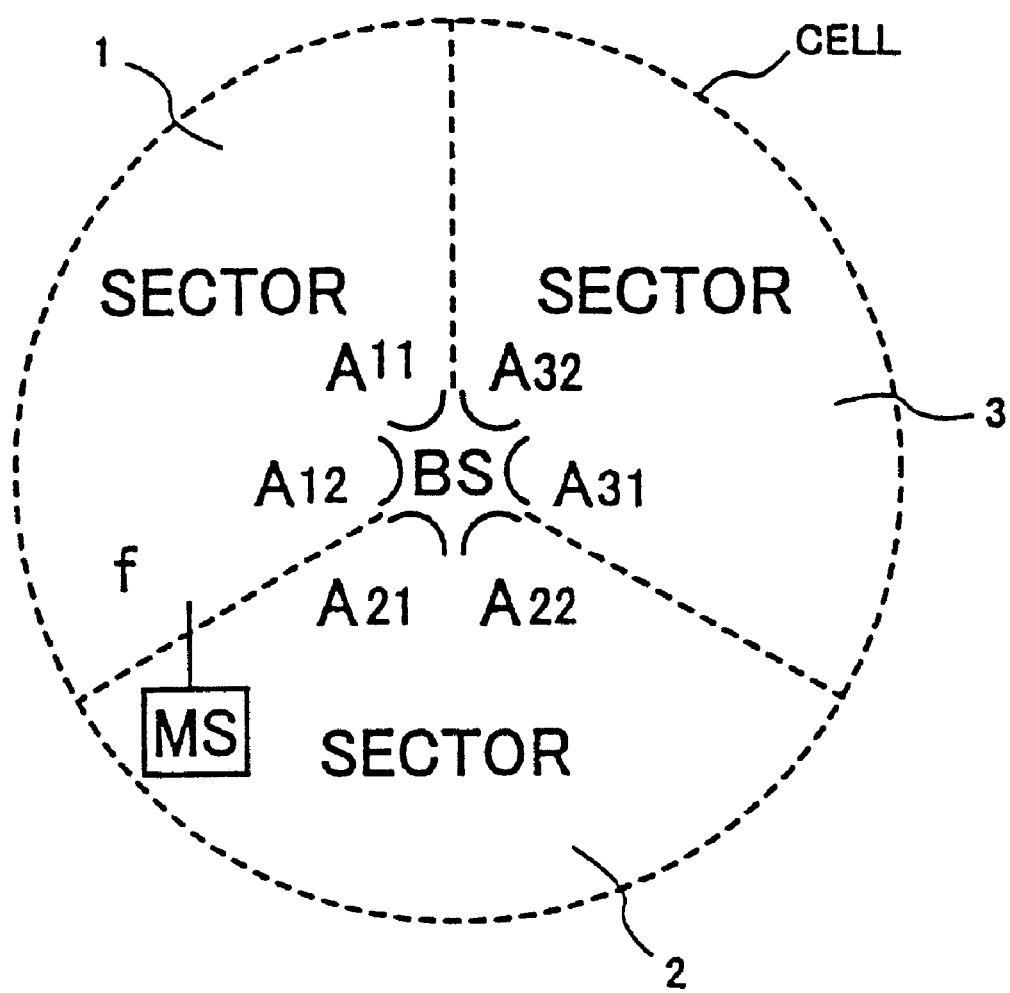
FIG. 4 is a diagram for explaining a service area of the base station.
Figure 5:
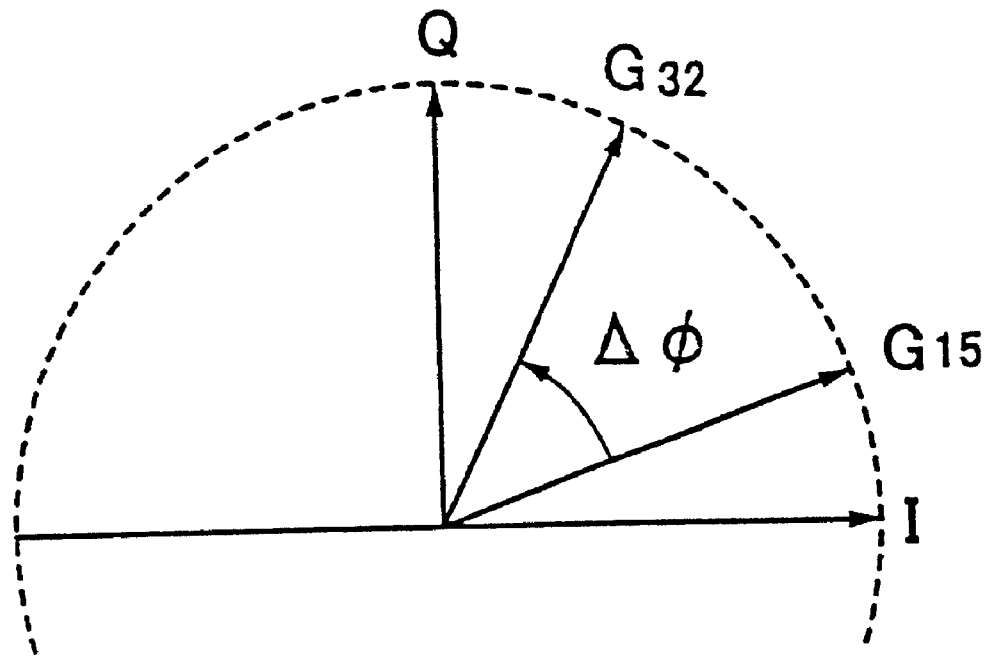
FIG. 5 is a diagram for explaining asynchronous detection.
Figure 6:
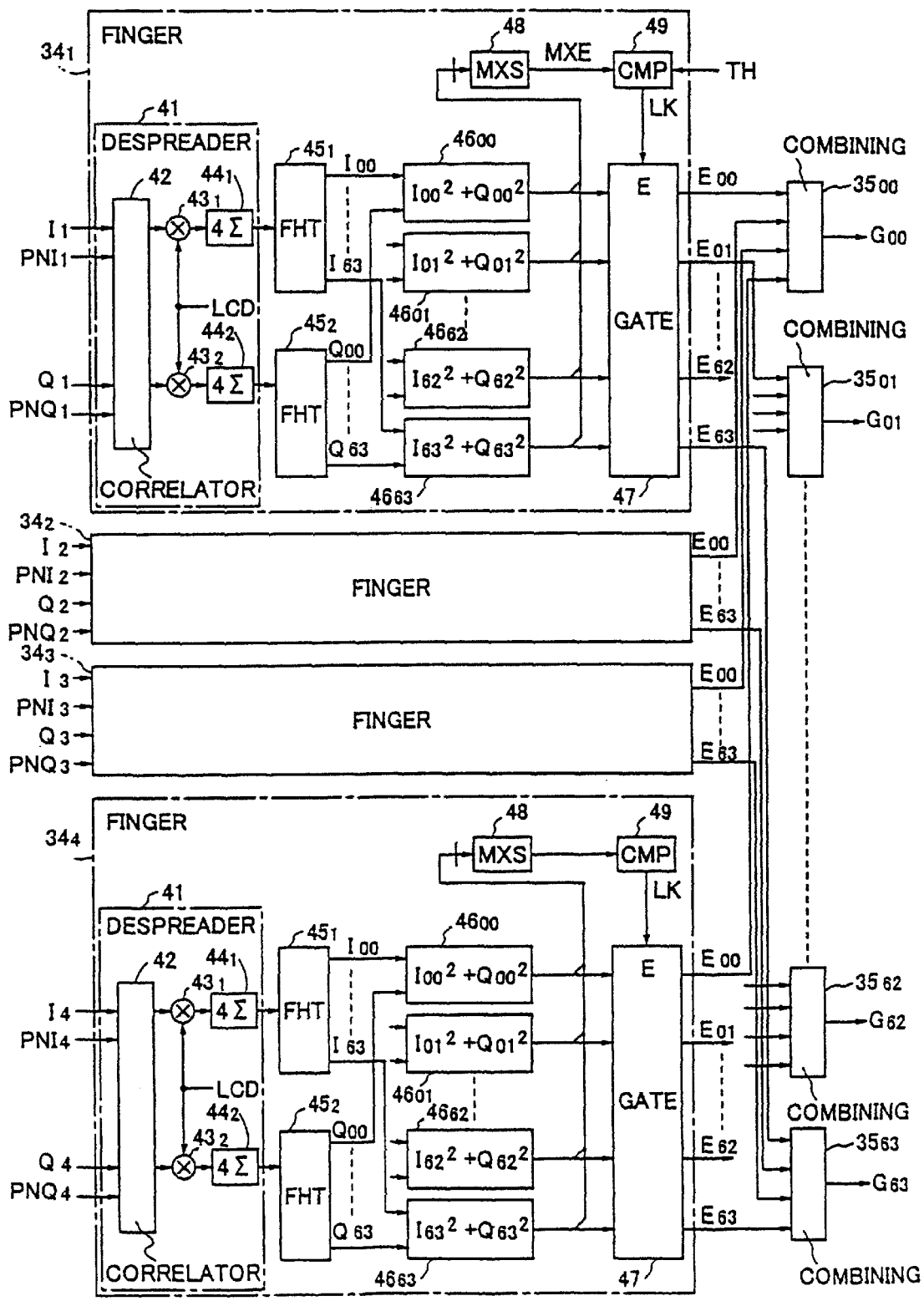
FIG. 6 is a system block diagram showing fingers forming the receiver part.
Figure 8A:
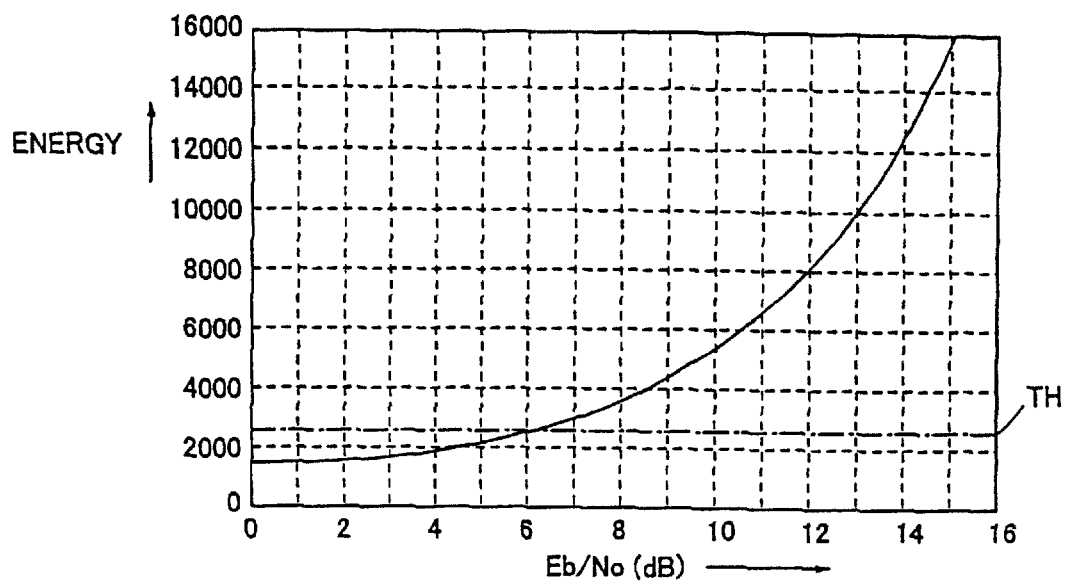
FIGS. 8A through 8C are diagrams for explaining energy characteristics of the conventional system.
Figure 8B:
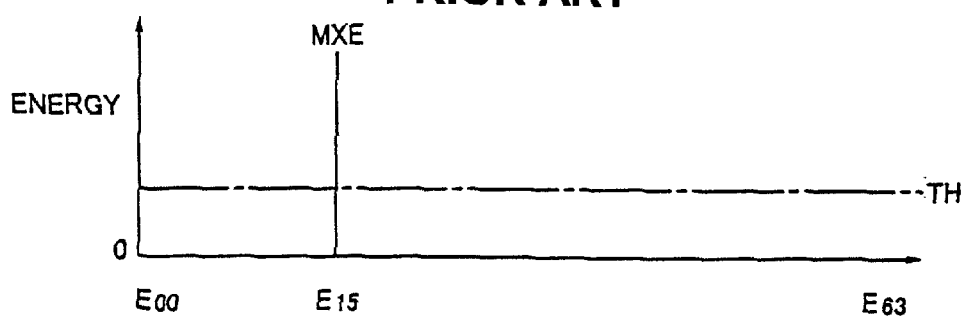
Figure 8C:
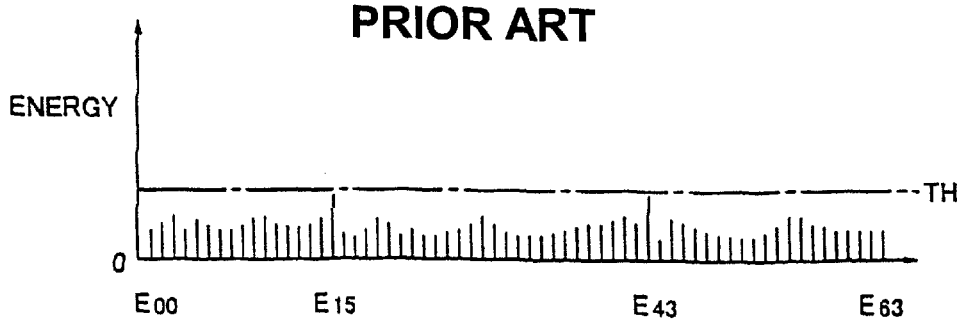
Figure 9:
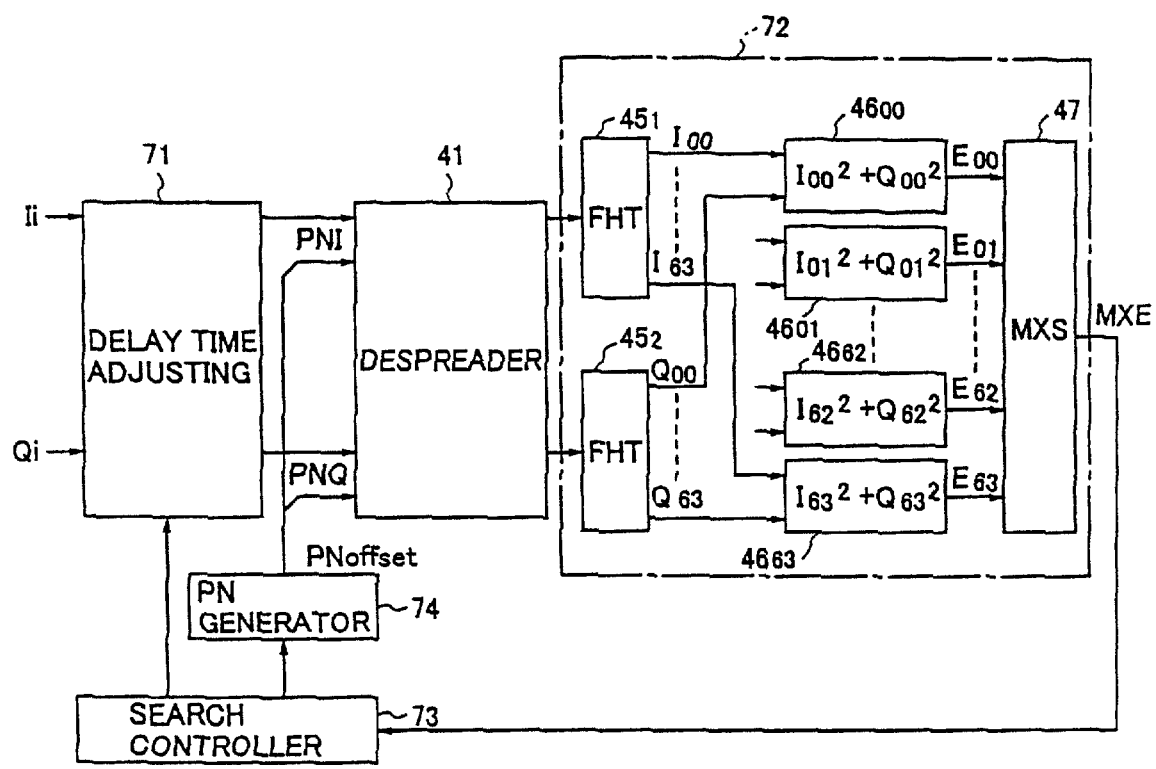
FIG. 9 is a system block diagram showing a conventional searcher.
Figure 10:
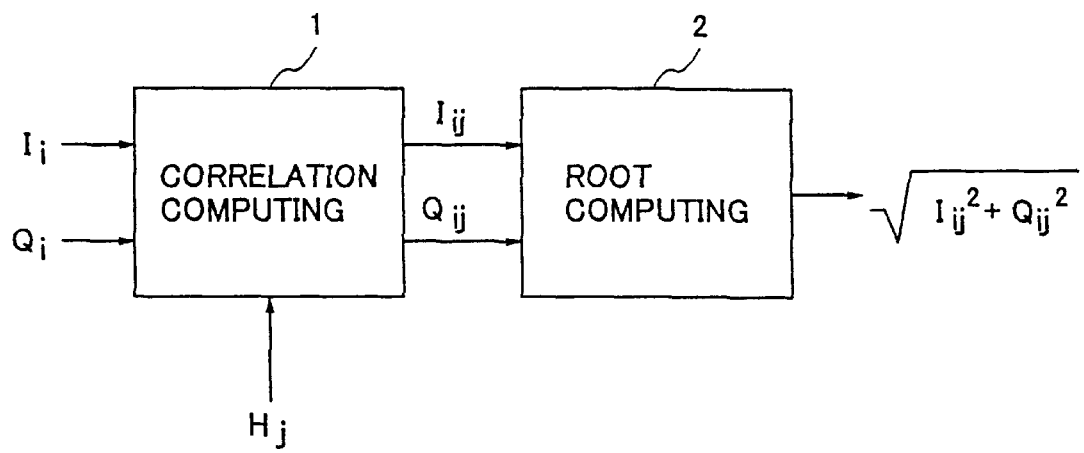
FIG. 10 is a system block diagram for explaining the operating principle of a first aspect of the present invention.

FIG. 10 is a system block diagram for explaining the operating principle according to the first aspect of the present invention. A correlation energy detector shown in FIG. 10 detects a magnitude of a correlation between a first signal series (Ii, Qi) described by I-Q orthogonal components and a predetermined second signal series ($H_J$), and includes a correlation computing means 1 and a root computing means 2. The correlation computing means 1 computes correlation values ($I_{ij}$, $Q_{ij}$) between the first signal series (Ii, Qi) and the predetermined second signal series ($H_J$). The root computing means 2 computes a root value of a sum of squares of the correlation values ($I_{ij}$, $Q_{ij}$) obtained from the correlation computing means 1. Hence, a root value of the sum-of-squares correlation value $\{\sqrt{(I_{ij}^2+Q_{ij}^2)}\}$ is obtained from the root computing means 2.

As will be described later in conjunction with FIG. 17, a set of correlation values ($I_{ij}$, $Q_{ij}$) which satisfies a conventional condition that the sum of squares correlation energy ($I_{ij}^2+Q_{ij}^2$) is constant, also satisfies a condition according to this first aspect of the present invention that the root of the sum-of-squares correlation energy, that is, $\{\sqrt{(I_{ij}^2+Q_{ij}^2)}\}$, is constant. Hence, the root of the sum-of-squares correlation energy may be used for the asynchronous detection system, similarly to the conventional case where the sum of squares correlation energy is used. As a result, it is possible to eliminate a phase component of the communication, and thereby avoid phase noise which is caused by fading and avoid a deterioration in the communication caused by a frequency error of a local signal.

In addition, according to the first aspect of the present invention, the number of bits of the root of the sum-of-squares correlation energy is greatly reduced to approximately ½ as compared to that of the sum of squares correlation energy. For this reason, the wiring scale and the circuit scale of the subsequent circuit stages can be reduced considerably.

Furthermore, the sum of squares correlation energy which is conventionally used is simply a sum of squares of the input correlation values ($I_{ij}$, $Q_{ij}$). Hence the accuracy of the magnitude comparison of the sum of squares correlation values does not exceed the accuracy of the magnitude comparison of the root of sum-of-squares correlation values. For example, if the sum of squares correlation values are $2^2+2^2=8$ and $2^2+3^2=13$, the result of the magnitude comparison of the sum of squares correlation values becomes 8<13. In this case, according to this first aspect of the present invention, the sum of squares correlation values are $\sqrt{8}=2$ and $\sqrt{13}=3$ if the figures below the decimal point are omitted, and the result of the magnitude comparison of the root of sum-of-squares correlation values becomes 2<3, which is similar to the result obtained by the magnitude comparison of the sum of squares correlation values. Therefore, the detection accuracy of the maximum energy and the accuracy of the combined energy are substantially unaffected by the correlation energy detection according to this first aspect of the present invention. Hence, appropriate detection of the correlation energy is possible using a simple structure.

Figure 11:
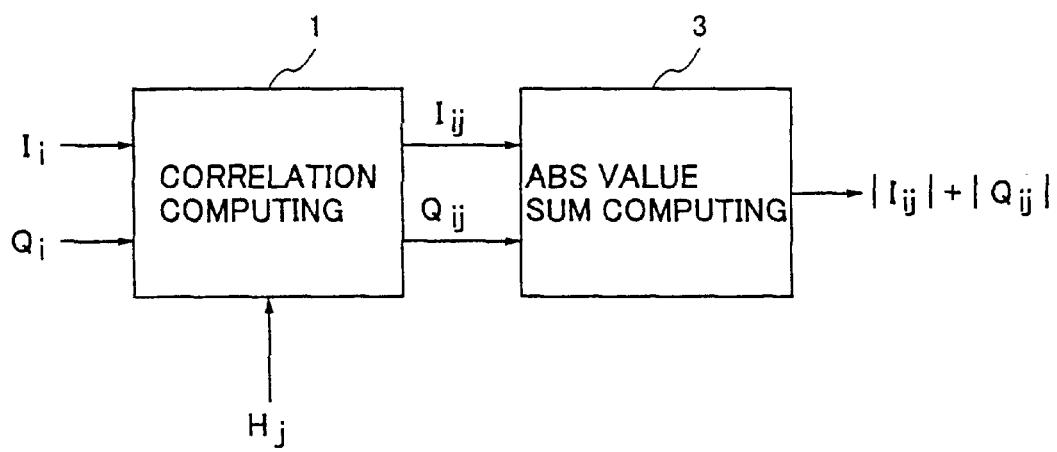
FIG. 11 is a system block diagram for explaining the operating principle of a second aspect of the present invention.

FIG. 11 is a system block diagram for explaining the operating principle according to the second aspect of the present invention. A correlation energy detector shown in FIG. 11 detects a magnitude of a correlation between a first signal series (Ii, Qi) described by I-Q orthogonal components and a predetermined second signal series ($H_j$), and includes a correlation computing means 1 and an absolute value sum computing means 3. The correlation computing means 1 computes correlation values ($I_{ij}$, $Q_{ij}$) between the first signal series (Ii, Qi) and the predetermined second signal series ($H_j$). The absolute value sum computing means 3 computes a sum of absolute values of the correlation values ($I_{ij}$, $Q_{ij}$) obtained from the correlation computing means 1. Hence, a sum of the absolute values of the correlation values, namely, ($|I_{ij}|+|Q_{ij}|$) is obtained from the absolute value sum computing means 3.

As will be described later in conjunction with FIG. 21, a set of correlation values ($I_{ij}$, $Q_{ij}$) which satisfies a conventional condition that the sum of squares correlation energy ($I_{ij}^2+Q_{ij}^2$) is constant, is converted into the absolute value sum correlation energy ($|I_{ij}|+|Q_{ij}|$) according to this second aspect of the present invention. As may be seen from FIG. 21, the locus of the absolute value sum correlation energy is similar to the locus of the root of sum-of-squares correlation energy described above in relation to the first aspect of the present invention.

Therefore, if the required accuracy is not very high, the absolute value sum correlation energy may be used for the asynchronous detection system, similarly to the conventional case where the sum of squares correlation energy is used. As a result, it is possible to eliminate a phase component of the communication. Furthermore, according to this second aspect of the present invention, the number of bits of the absolute value sum correlation energy is greatly reduced to approximately ½ as compared to that of the sum of squares correlation energy. For this reason, the wiring scale and the circuit scale of the subsequent circuit stages can be reduced considerably. In addition, this second aspect of the present invention does not require the multipliers which would be necessary if the sum of squares ($I_{ij}^2+Q_{ij}^2$) were to be computed, and the structure of the correlation energy detector can be made extremely simple from this point of view.

In the correlation energy detector shown in FIG. 11, it is possible to additionally provide a correcting means for correcting the value of the absolute value sum ($|I_{ij}|+|Q_{ij}|$) in a direction so as to make the value approximately constant, with respect to the set of correlation values ($I_{ij}$, $Q_{ij}$) which satisfies the condition that the sum of squares correlation value ($I_{ij}^2+Q_{ij}^2$) is constant. In this case, the correcting means corrects the value of the absolute value sum ($|I_{ij}|+|Q_{ij}|$) in the direction such that the absolute value sum ($|I_{ij}|+|Q_{ij}|$) becomes approximately constant regardless of a decoding phase the correlation values ($I_{ij}$, $Q_{ij}$), that is, in the direction which makes the locus of the absolute value sum correlation energy approach a circle. As a result, it is possible to make more accurate comparisons of the magnitudes of the absolute value sum correlation energies and the combined energies thereof.

In addition, as will be described later in conjunction with FIGS. 23 and 26, the correcting means may be provided with a correction computing means for subtracting a value $\{(|I_{ij}|+|Q_{ij}|-||I_{ij}|-|Q_{ij}||)/4\}$ from the input absolute value sum ($|I_{ij}|+|Q_{ij}|$). In this case, the input absolute value sum ($|I_{ij}|+|Q_{ij}|$) is corrected in a direction so as to approach the root of sum-of-square correlation value $\{\sqrt{(I_{ij}^2+Q_{ij}^2)}\}$. Hence, it is possible to make more accurate comparisons of the magnitudes of the absolute value sum correlation energies and the combined energies thereof after the correction.

On the other hand, as will be described later in conjunction with FIGS. 24 and 26, the correcting means may be provided with a correction computing means for adding a value $\{(||I_{ij}|-|Q_{ij}||)/4\}$ to a value $\{3(|I_{ij}|+|Q_{ij}|)/4\}$. In this case, it is also possible to make more accurate comparisons of the magnitudes of the absolute value sum correlation energies and the combined energies thereof after the correction.

Furthermore, as will be described later in conjunction with FIGS. 25 and 27, the correcting means may be provided with a correction computing means for adding a value $\{(||I_{ij}|-|Q_{ij}||)/2\}$ to a value ($|I_{ij}|+|Q_{ij}|$). In this case, the input absolute value sum correlation energy is corrected in a direction opposite to that shown in FIG. 26. It is thus possible to make more accurate comparisons of the magnitudes of the absolute value sum correlation energies and the combined energies thereof after the correction.

Of course, the locus of the absolute value sum correlation energy simply needs to approach the circle after the correction, and the size (radius) of the circle may be arbitrary.

According to a third aspect of the present invention, a radio communication apparatus subjects each signal series which is described by I-Q orthogonal components and is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values. Each finger includes a correlation energy detector according to the first or second aspect of the present invention described above, so as to obtain the correlation values of the codes. In this case, it is possible to make appropriate detection of the correlation energies and to make appropriate combining of the fingers (RAKE), using a simple structure in which the wiring scale and the circuit scale are relatively small.

According to a fourth aspect of the present invention, a radio communication apparatus subjects each signal series which is described by I-Q orthogonal components and is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values. The radio communication apparatus is provided with a searcher which monitors the reception state by obtaining the correlation values of the codes for each path, and performs a path selection, a delay time adjustment and the like with respect to each finger. This searcher includes a correlation energy detector according to the first or second aspect of the present invention described above, so as to obtain the correlation values of the codes. In this case, it is possible to make appropriate search control using a simple structure in which the wiring scale and the circuit scale are relatively small.

Next, a description will be given of various embodiments of the correlation energy detector according to the present invention and the radio communication apparatus according to the present invention, by referring to FIGS. 12 through 28. In FIGS. 12 through 28, those parts which are the same as those corresponding parts in FIGS. 1 through 11 are designated by the same reference numerals, and a description thereof will be omitted. Further, in FIGS. 12 through 28, the same reference numerals are used to designate the same elements.

Figure 12:
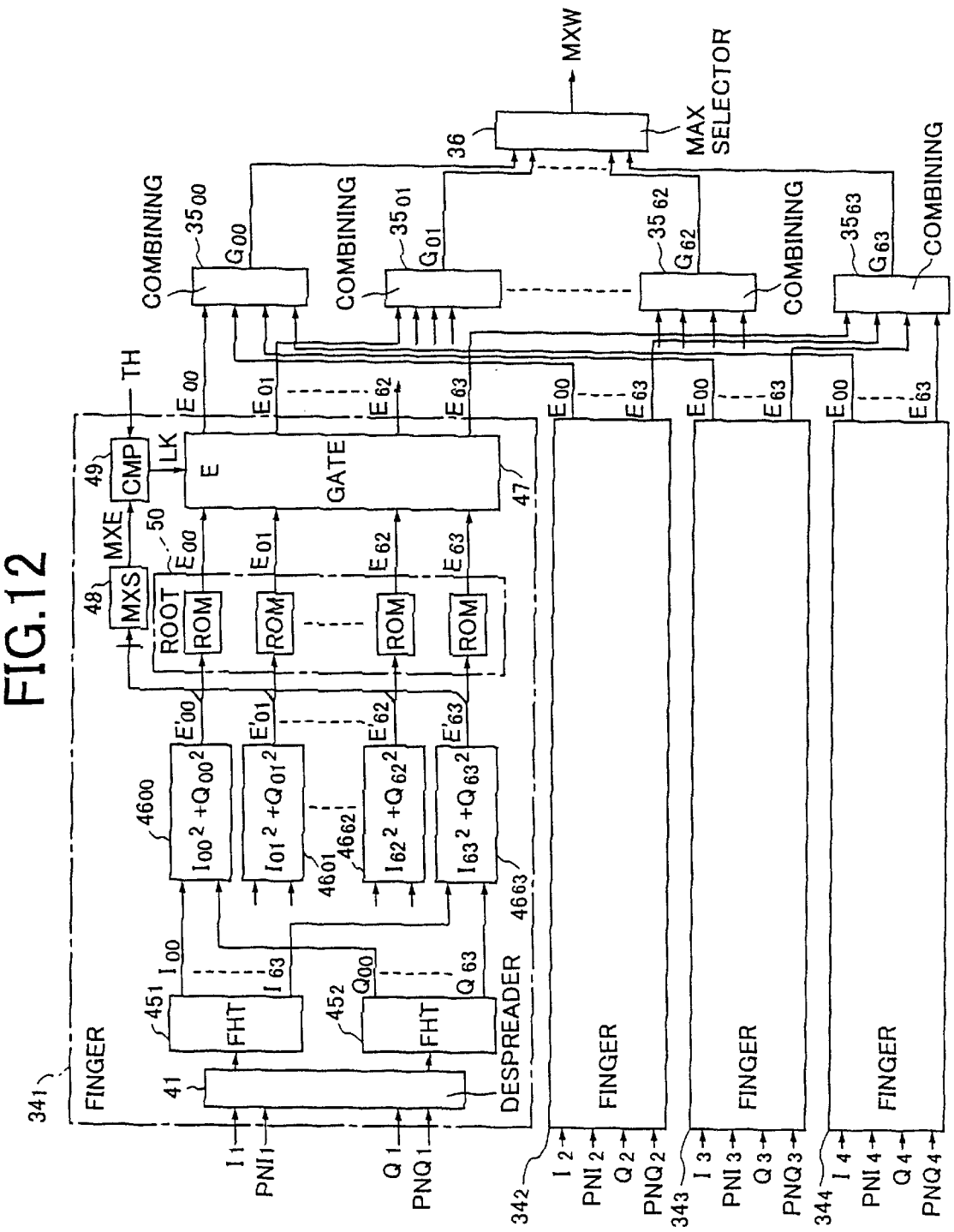
FIG. 12 is a system block diagram showing the construction of a part of a first embodiment of a radio communication apparatus according to the present invention.

FIG. 12 is a system block diagram showing the construction of a part of a first embodiment of the radio communication apparatus according to the present invention. In FIG. 12, a root computing unit (ROOT) 50 is provided at a stage subsequent to the energy calculation units $46_{00}$ through $46_{63}$ which calculate the sum of squares correlation energies. Otherwise, the construction of this first embodiment of the radio communication apparatus is the same as that described above in conjunction with FIGS. 3 and 6.

The root computing unit 50 includes ROMs which store square root data E $(=\sqrt{(I_{ij}^2+Q_{ij}^2)})$ in correspondence with correlation energy outputs E' $(=I^2+Q^2)$. In this case, the corresponding square root data E $(=\sqrt{(I_{ij}^2+Q_{ij}^2)})$ can be read from the ROMs by inputting the correlation energy outputs E' $(=I^2+Q^2)$ from the energy calculation units $46_{00}$ through $46_{63}$ as address inputs to the ROMs. Accordingly, the number of bits of the root of sum-of-squares correlation energies $E_{00}$ through $E_{63}$ output from the ROMs can be reduced compared to the number of bits of the conventional sum of squares correlation energies. For this reason, it is possible to greatly reduce the wiring scale and circuit scale of the subsequent circuit stages.

Of course, the ROMs may be formed by a plurality of memory regions of a single ROM.

According to this embodiment, the accuracy of detecting the maximum value of the root of sum-of-squares correlation energy E or the combined energy G thereof will not deteriorate at the subsequent circuit stages. This no deterioration will be described hereunder for the maximum value detection accuracy of the root of sum-of-squares correlation energy E, for the sake of convenience. In other words, when the maximum correlation outputs from the fast Hadamard transform units (FHT) $45_1$ and $45_2$ are $I_{00}=10$ and $Q_{00}=10$, for example, the sum of squares correlation energy $E'_{00}$ becomes $E'_{00}=100+100=200$, and the root of sum-of-square correlation energy $E_{00}$ becomes $E_{00}=\sqrt{(200)}=14$ by omitting the figures below the decimal point. In addition, when the second largest correlation from the fast Hadamard transform units (FHT) $45_1$ and $45_2$ are $I_{01}=10$ and $Q_{00}=9$, for example, the sum of squares correlation energy $E'_{01}$ becomes $E'_{01}=100+81=181$, and the root of sum-of-square correlation energy $E_{01}$ becomes $E_{01}=\sqrt{(181)}=13$ by omitting the figures below the decimal point. In the conventional case where the sum of squares correlation energies are compared under the same conditions, the comparison leads to a relationship $E'_{00}(=200)>E'_{01}(=181)$. In this embodiment which compares the roots of the sum of squares correlation energies, the comparison leads to a relationship $E_{00}(=14)>E_{01}(=13)$ which is the same as in the conventional case in terms of the magnitude relationship. Because the difference between the compared correlation outputs will not become less than one in this particular case, the relationship of the compared correlation outputs in this embodiment will always stand.

Figure 13:
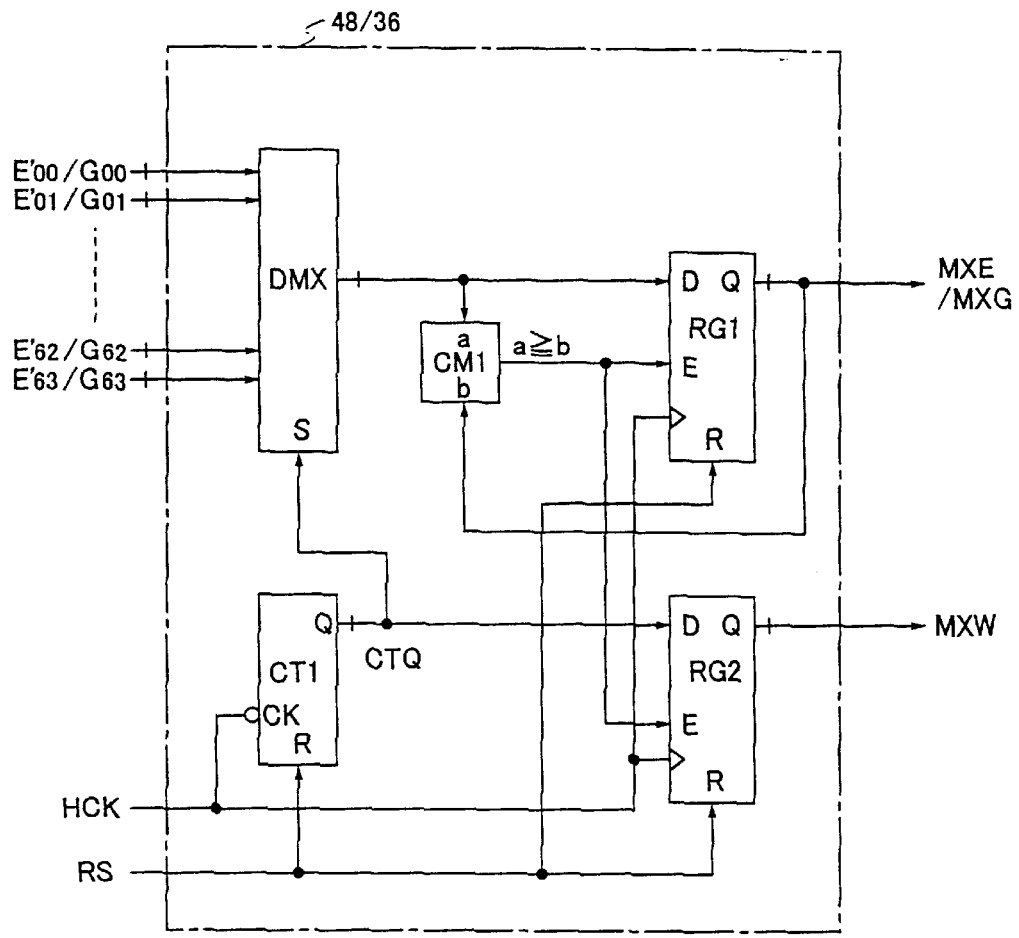
FIG. 13 is a system block diagram showing an embodiment of a maximum value selector of the first embodiment.
Figure 14:
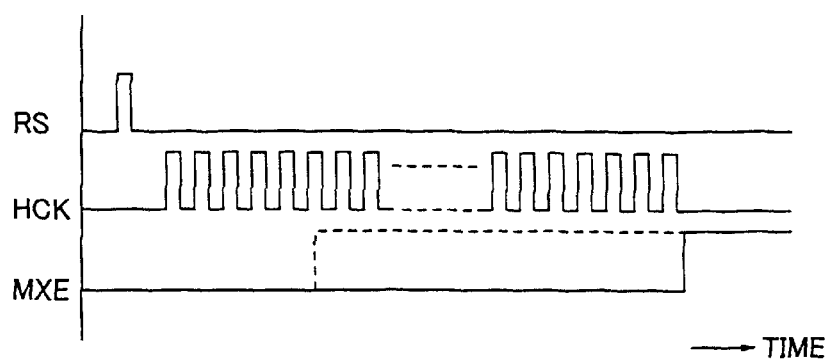
FIG. 14 is a timing chart for explaining the operation of the maximum value selector.

FIG. 13 is a system block diagram showing an embodiment of the maximum value selector 48 of the first embodiment, and FIG. 14 is a timing chart for explaining the operation of the maximum value selector 48 shown in FIG. 13. This embodiment shown in FIG. 13 may also be used as the maximum value selector 36. Hence, the correlation energy E' or E or, the combined energy G may be input to the maximum value selector 48 or 36.

The maximum selector 48 or 36 shown in FIG. 13 has a small circuit scale by employing a serial computing system. In FIG. 13, a counter CT1 counts up from 0 to 64 in response to a predetermined number of pulses of a high-speed clock HCK shown in FIG. 14, after being reset by a reset signal RS shown in FIG. 14. Hence, a data multiplexer DMX makes a high-speed scan of each of the input correlation energies $E'_{00}$ through $E'_{63}$ (or combined energies $G_{00}$ through $G_{63}$. In this state, a comparator CM1 compares an output "a" of the multiplexer DMX and an output "b" of a maximum value storing register RG1, and outputs a comparison result signal $(a \geq b)=1$ if $a \geq b$. Hence, the register RG1 holds the output energy of the multiplexer DMX at this point in time, and a register RG2 holds a counted value CTQ of the counter CT at this point in time. When the counted value CTQ of the counter CT1 reaches 64, the register RG1 holds the maximum value MXE shown in FIG. 14 of the correlation energies $E'_{00}$ through $E'_{63}$ or the maximum value MXG of the combined energies $G_{00}$ through $G_{63}$, and the register RG2 holds a counted value corresponding to the maximum value MXE or MXG. This counted value held in the register RG2 corresponds to the Walsh code number.

Figure 15:
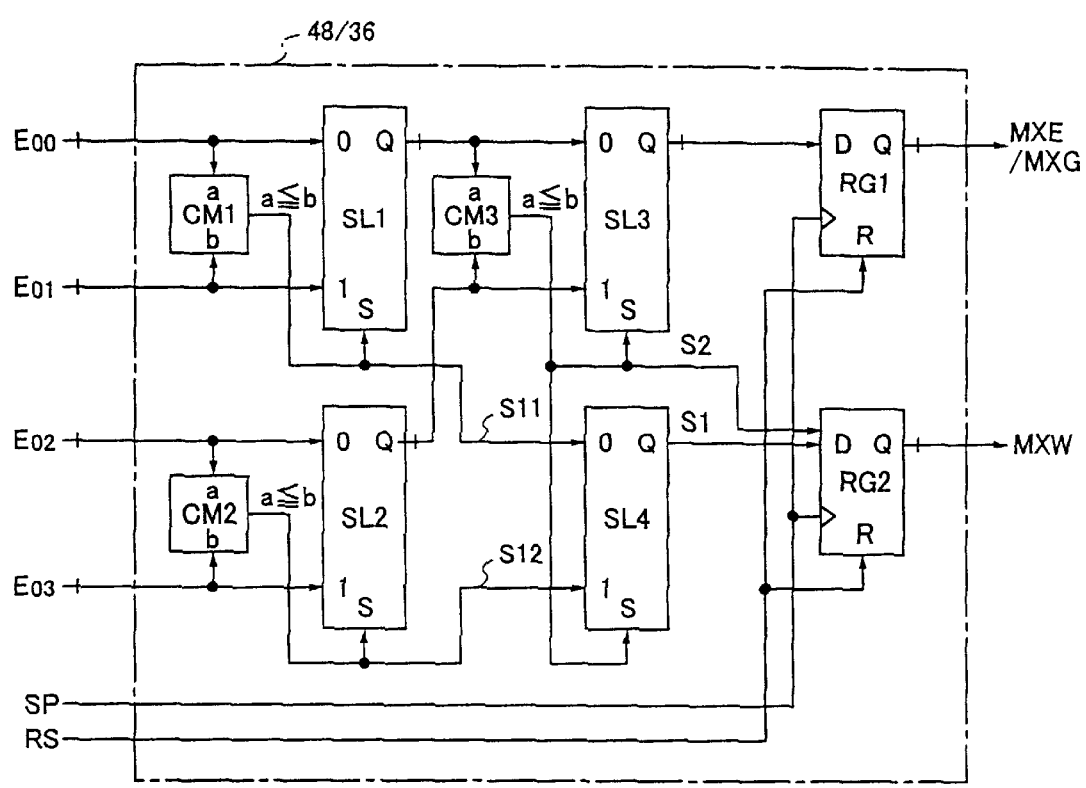
FIG. 15 is a system block diagram showing another embodiment of the maximum value selector of the first embodiment.

FIG. 15 is a system block diagram showing another embodiment of the maximum value selector of the first embodiment. This embodiment shown in FIG. 15 may also be used as the maximum value selector 36. Hence, the correlation energy E' or E or, the combined energy G may be input to the maximum value selector 48 or 36.

The maximum value selector shown in FIG. 15 employs a parallel computing system having a high processing speed. For the sake of convenience, it is assumed in FIG. 15 that only four correlation energies $E_{00}$ through $E_{63}$ are input to the maximum value selector 48. In FIG. 15, a comparator CM1 compares the energies $E'_{00}$ and $E'_{01}$ as inputs "a" and "b", and outputs a comparison result signal $(a \leq b)=1$ if $a \leq b$. Hence, a selector SL1 selectively outputs the larger energy $E'_{01}$. Similarly, a comparator CM2 compares the energies $E'_{02}$ and $E'_{03}$ as inputs "a" and "b", and outputs a comparison result signal $(a \leq b)=1$ if $a \leq b$. Hence, a selector SL2 selectively outputs the larger energy $E'_{03}$. On the other hand, a comparator CM3 compares the larger energy $E'_{01}$ output from the selector SL1 and the larger energy $E'_{03}$ output from the selector SL2 as inputs "a" and "b", and outputs a comparison result signal $(a \leq b)=1$ if $a \leq b$. Hence, a selector SL3 selectively outputs the larger energy $E'_{03}$ to a register RG1.

In this state, an output signal S2 of the comparator CM3 indicates an upper bit of the comparison result, and indicates that the input group of the energies $E'_{00}$ and $E'_{01}$ is larger if S2=0, and indicates that the input group of the energies $E'_{02}$ and $E'_{03}$ is larger if S2=1. In addition, this signal S2 is input to a selector SL4. The selector SL4 selectively outputs an output signal S11 of the comparator CM1 to a register RG2 as a signal S1 if S2=0, and selectively outputs an output signal S12 of the comparator CM2 to the register RG2 as the signal S1 if S2=1.

Accordingly, if the input energy $E_{03}$ is the maximum, the signals S2 and S1 become S2=1 and S1=1, and indicate that an input port 03 receives the maximum energy $E_{03}$. Similarly, if the input energy $E_{02}$ is the maximum, the signals S2 and S1 become S2=1 and S1=0, and indicate that an input port 02 receives the maximum energy $E_{02}$. If the input energy $E_{01}$ is the maximum, the signals S2 and S1 become S2=0 and S1=1, and indicate that an input port 01 receives the maximum energy $E_{01}$. In addition, if the input energy $E_{00}$ is the maximum, the signals S2 and S1 become S2=0 and S1=0, and indicate that an input port 00 receives the maximum energy $E_{00}$. At the timing when the above described comparison is completed, a pulse signal SP is generated and supplied to the registers RG1 and RG2. Thus, the register RG1 holds the maximum value MXE($=E_{03}$) of the input correlation energies $E_{00}$ through $E_{03}$, and the register RG2 holds the port number MXW of the input port 03 (that is, the Walsh code) corresponding to the maximum value MXE. A reset signal RS resets the registers RG1 and RG2, similarly as in the embodiment shown in FIG. 13.

Actually, circuit parts for processing sixty-four signals are required to process the correlation energies $E_{00}$ through $E_{63}$ or the combined energies $G_{00}$ through $G_{63}$, as compared to the circuit parts shown in FIGS. 13 and 15 which process only four signals. Accordingly, it may be readily seen that the reduction of the number of bits of the individual correlation or combined energy achieved in this first embodiment greatly reduces the wiring scale and the circuit scale of the subsequent circuit stages.

Figure 16:
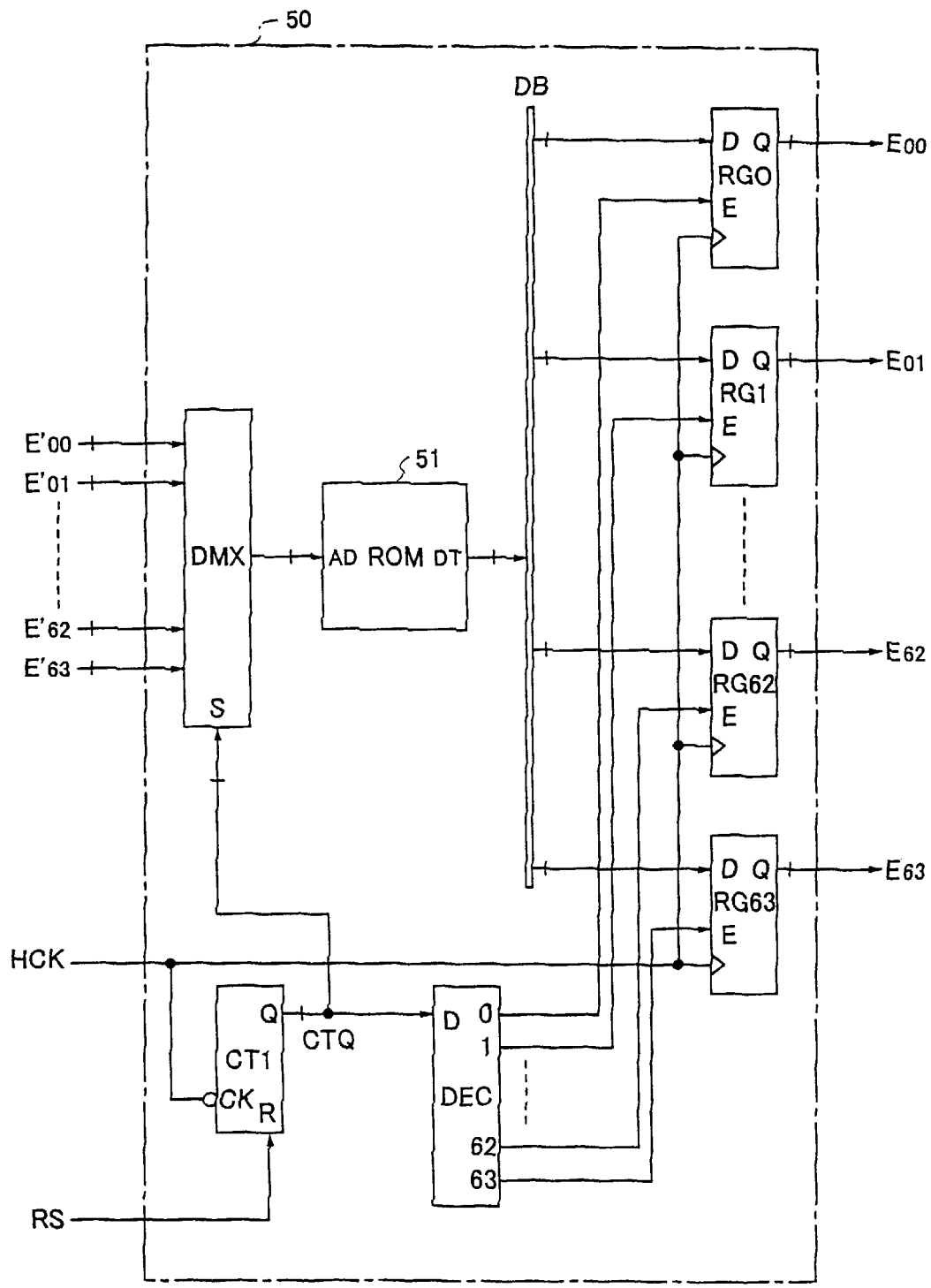
FIG. 16 is a system block diagram showing another embodiment of a root computing unit of the first embodiment.

FIG. 16 is a system block diagram showing another embodiment of the root computing unit 50 of this first embodiment. Compared to the root computing unit 50 shown in FIG. 12, this embodiment shown in FIG. 16 has a small circuit scale by employing a serial computing system.

In FIG. 16, a counter CT1 counts up from 0 to 64 in response to a predetermined number of pulses of a high-speed clock HCK, after being reset by a reset signal RS. Hence, a data multiplexer DMX makes a high-speed scan of each of the sum of squares correlation energies $E'_{00}$ through $E'_{63}$. In this state, each of the outputs $E'_{00}$ through $E'_{63}$ of the multiplexer DMX are input to an address input terminal AD of a ROM 51. The root of sum-of-square correlation energies $E_{00}$ through $E_{63}$ respectively corresponding to the sum of squares correlation energies $E'_{00}$ through $E'_{63}$ are successively read via a data output terminal DT (data bus DB) of the ROM 51.

On the other hand, a decoder DEC decodes a counted output CTQ of the counter CT1, and successively outputs from output terminals 0 through 63 a set enable signal E=1 for registers RG0 through RG63 in correspondence with the counted output CTQ=0 through 63. Hence, The registers RG0 through RG63 respectively hold the root of sum-of-square correlation energies $E_{00}$ through $E_{63}$ which are output from the ROM 51.

Figure 17:
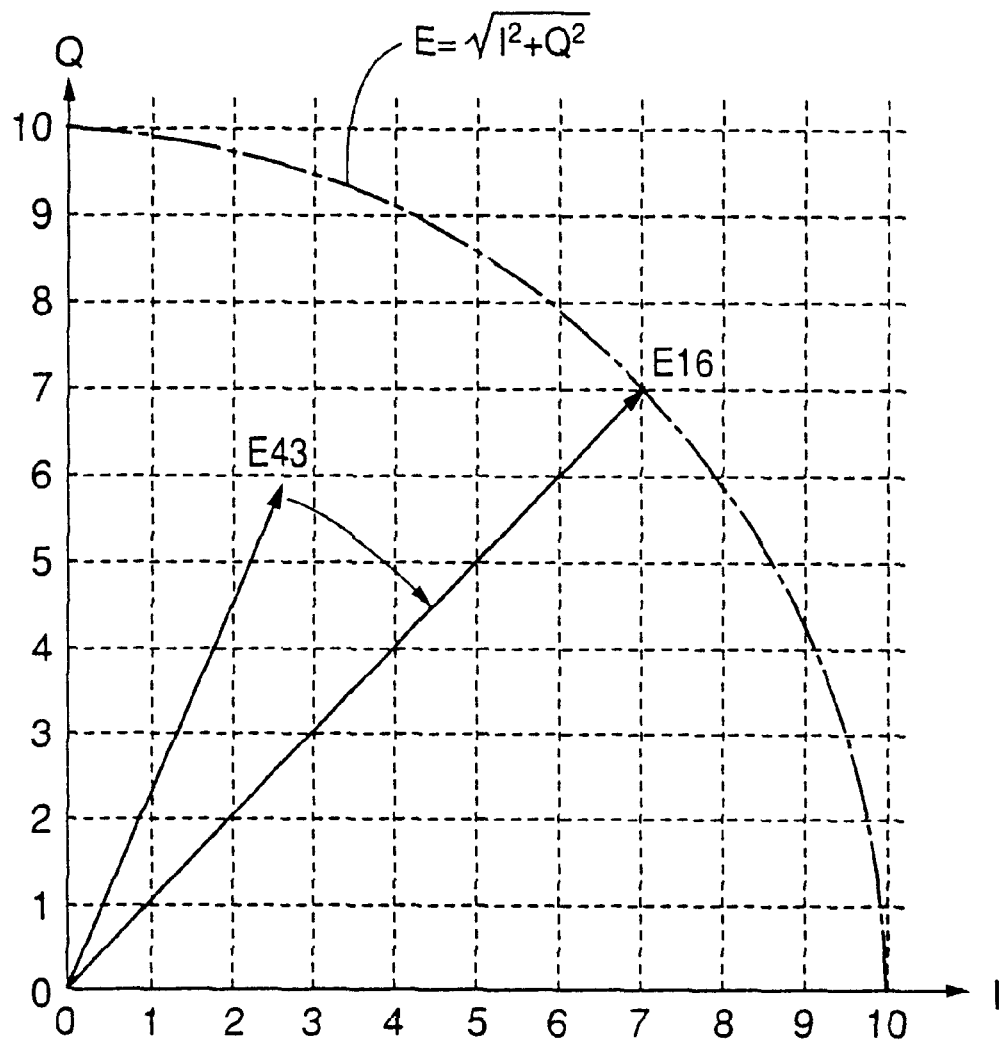
FIG. 17 is a diagram for explaining a root of sum-of-squares correlation energy obtained in the first embodiment.

FIG. 17 is a diagram for explaining a root of sum-of-squares correlation energy obtained in this first embodiment. In the following description, $I_{ij}$ and $Q_{ij}$ are also respectively referred to as I and Q for the sake of convenience. FIG. 17 shows, with respect to a received symbol, a maximum root of sum-of-square correlation energy $E_{15}=\sqrt{(I_{15}^2+Q_{15}^2)}=10$ and a second largest root of sum-of-square correlation energy $E_{43}=\sqrt{(I_{43}^2+Q_{43}^2)}<10$. In this first embodiment in which the asynchronous detection is employed, the correlation demodulated signals I and Q are converted into the root of sum-of-square correlation energy $\{\sqrt{(I^2+Q^2)}\}$ which has a characteristic similar to that of the sum of squares correlation energy $(I^2+Q^2)$, so that the clock phase error component between the transmitting and receiving ends can be eliminated. Moreover, since the clock phase error remains virtually unchanged during an instantaneous interval such as when receiving one symbol, each of the sum of squares correlation energies $E_{15}$ and $E_{43}$ shown in FIG. 17 satisfactorily reflects the effects of the noise (random noise) added to the received symbol. Accordingly, it is possible to make the maximum value detection with a high accuracy by comparing the magnitudes of the sum of squares correlation energies $E_{15}$ and $E_{43}$ as they are, regardless of the decoded phases of the sum of squares correlation energies $E_{15}$ and $E_{43}$.

Figure 18:
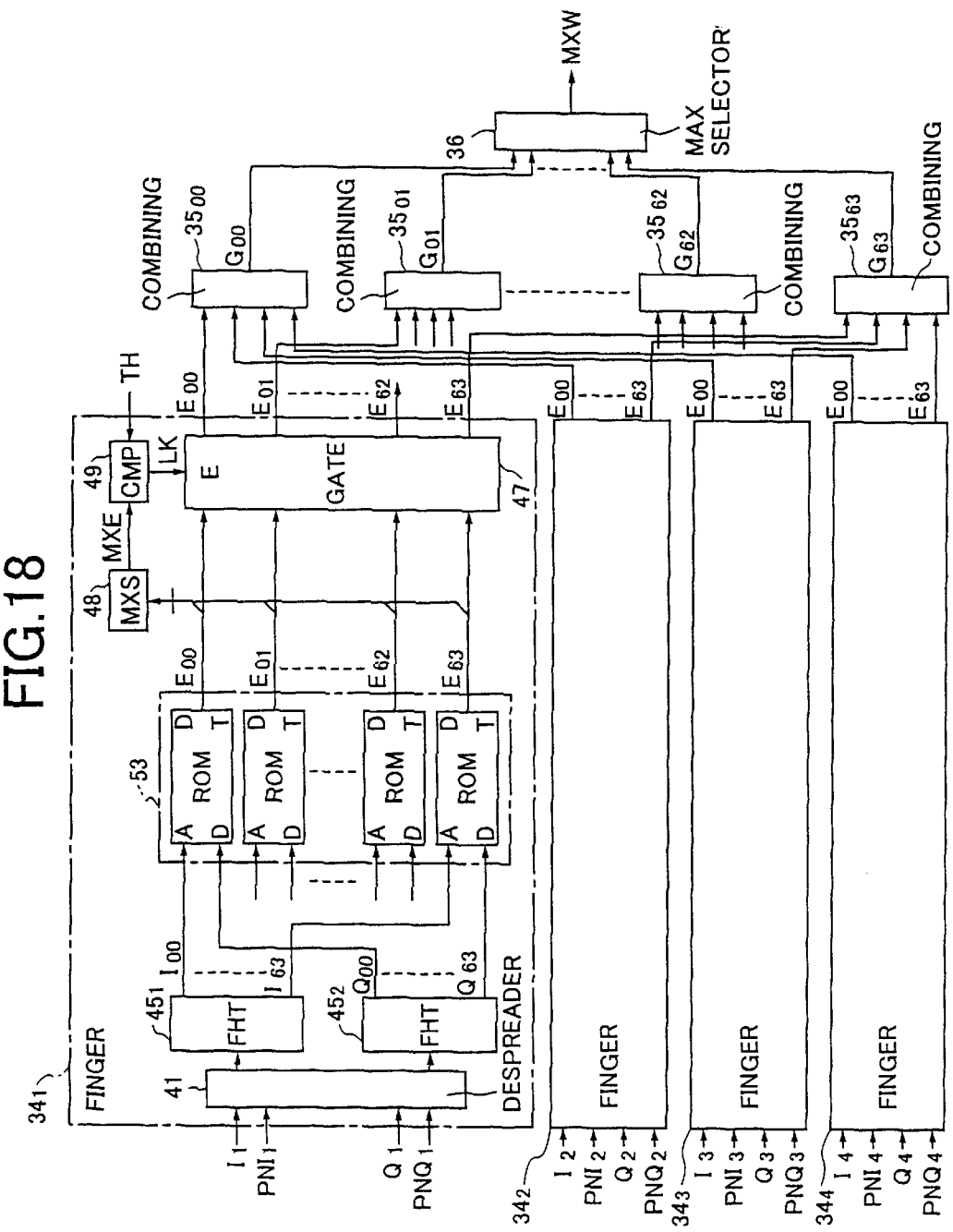
FIG. 18 is a system block diagram showing the construction of a part of a second embodiment of the radio communication apparatus according to the present invention.

FIG. 18 is a system block diagram showing the construction of a part of a second embodiment of the radio communication apparatus according to the present invention. In this second embodiment, the maximum value selector 48, which is used to detect the finger locked state, detects the maximum value MXE based on the root of sum-of-square correlation energies $E_{00}$ through $E_{63}$. Hence, the sum of squares correlation energy computing units $46_{00}$ through $46_{63}$ and the root computing unit 50 shown in FIG. 12 are omitted in this second embodiment.

Instead, this second embodiment is provided with a root of sum of squares computing unit 53. This computing unit 53 includes ROMs, including a ROM which stores the root of sum-of-square correlation energy data $\{\sqrt{(I_{00}^2+Q_{00}^2)}\}$. When a set of the correlation demodulated data $(I_{00}+Q_{00})$ is input to the ROMs as the address, the corresponding root of sum-of-square correlation energy data $\{\sqrt{(I_{00}^2+Q_{00}^2)}\}$ is read from the ROM. The other ROMs of the computing unit 53 similarly store corresponding root of sum-of-square correlation energy data corresponding to the correlation demodulated data $(I_{01}, Q_{01})$ through $(I_{63}, Q_{63})$ which are input as the addresses. Otherwise, the construction of this second embodiment is basically the same as that of the first embodiment shown in FIG. 12.

Of course, instead of providing one ROM in the computing unit 53 for each set of correlation demodulated data (I, Q), it is possible to provide a single ROM as in the case shown in FIG. 16, and time-divisionally use this single ROM.

According to this second embodiment, the maximum value selector 48 detects the maximum value based on the root of sum-of-square correlation energies $E_{00}$ through $E_{63}$ which have small number of bits. As a result, the required wiring scale and circuit scale of the maximum value selector 48 are greatly reduced, without deteriorating the maximum value detection accuracy.

Figure 19:
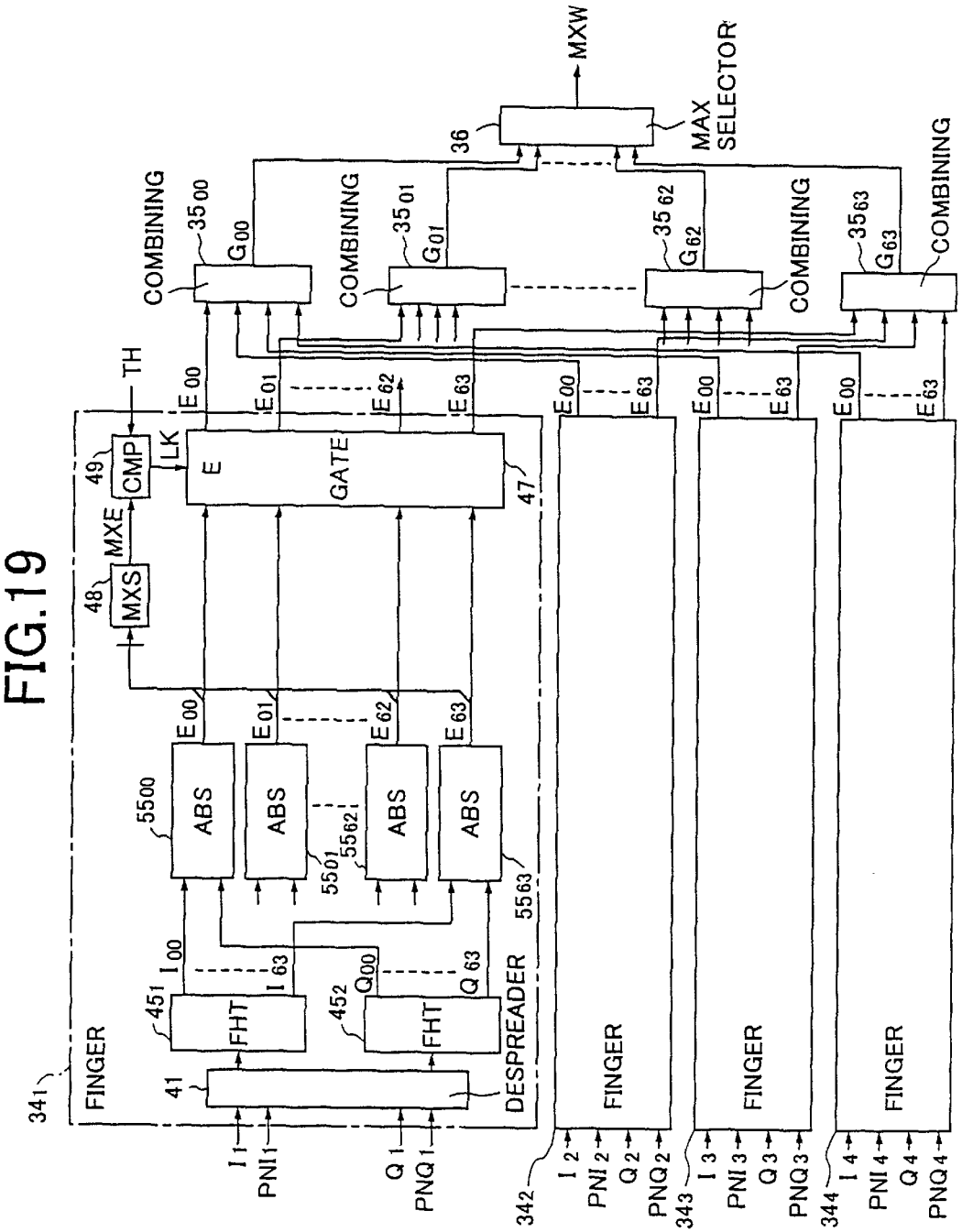
FIG. 19 is a system block diagram showing the construction of a part of a third embodiment of the radio communication apparatus according to the present invention.

FIG. 19 is a system block diagram showing the construction of a part of a third embodiment of the radio communication apparatus according to the present invention. Instead of using the root of sum-of-square correlation energy $\{\sqrt{(I^2+Q^2)}\}$, this third embodiment uses an absolute value sum correlation energy $(|I|+|Q|)$.

In other words, absolute value sum correlation energy computing units (ABS) $55_{00}$ through $55_{63}$ are provided in this third embodiment, as shown in FIG. 19. Otherwise, the construction of this third embodiment is basically the same as that of the first embodiment shown in FIG. 12, except that the root computing unit 50 is omitted in FIG. 19.

Figure 20:
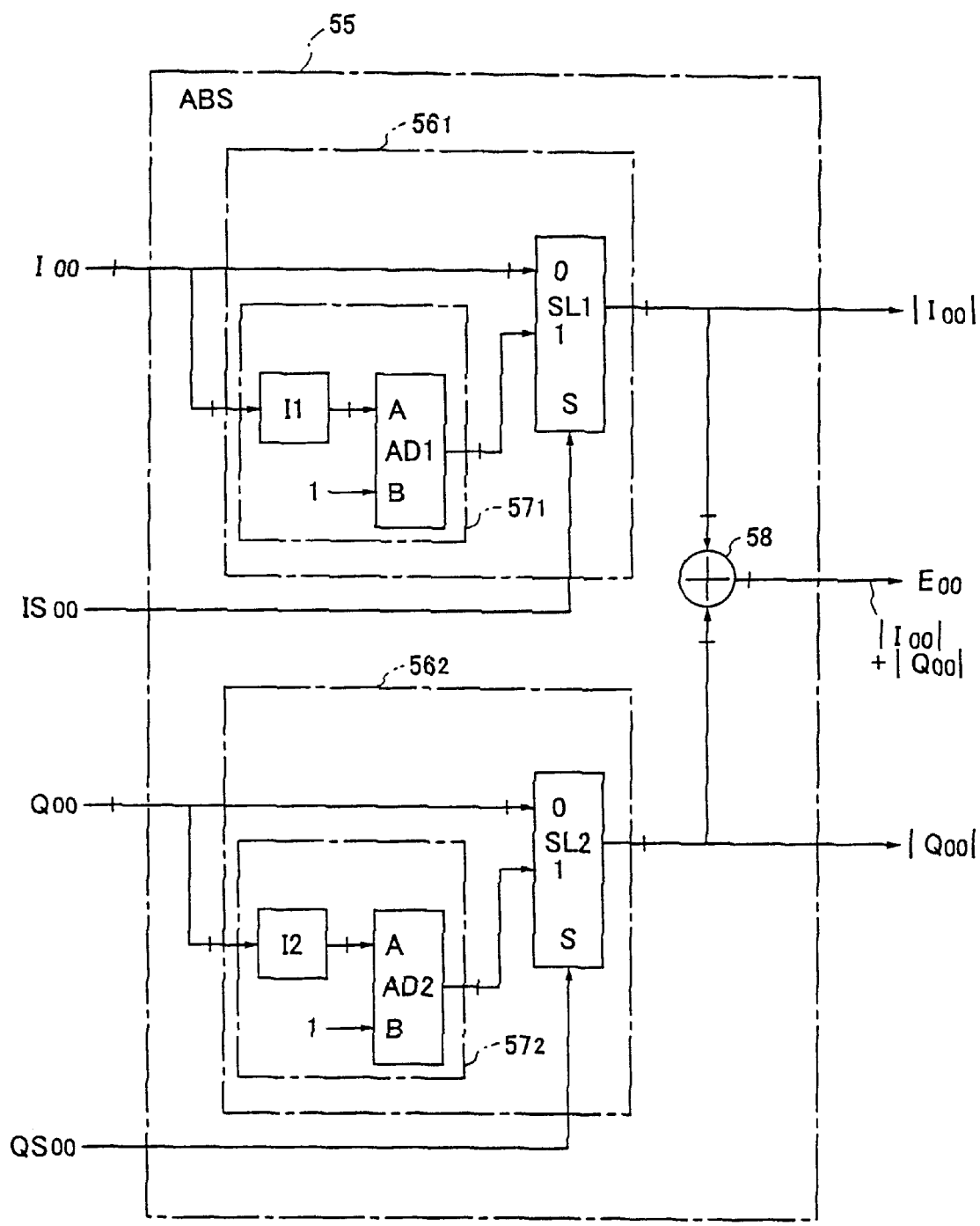
FIG. 20 is a system block diagram showing an absolute value sum correlation energy computing unit of the third embodiment.

FIG. 20 is a system block diagram showing an absolute value sum correlation energy computing unit of the third embodiment. An absolute value sum correlation energy computing unit 55 shown in FIG. 20 includes absolute value circuits $56_1$ and $56_2$, and an adder 58. The absolute value circuit $56_1$ includes a twos complement unit $57_1$ and a selector SL1, and the absolute value circuit $56_2$ includes a twos complement unit $57_2$ and a selector SL2.

An input I-axis correlation demodulated data (for example, $I_{00}$) includes a sign bit $IS_{00}$ (1 bit) which indicates the positive or negative sign, and a plurality of magnitude bits $I_{00}$ which indicate the magnitude. The input magnitude bits $I_{00}$ are input to the terminal 0 of the selector SL1. The input magnitude bits $I_{00}$ are also input to the twos complement unit $57_1$, wherein the all of the magnitude bits $I_{00}$ are logically inverted (that is, ones complement) by an inverter circuit I1, and is then converted into a twos complement value by being added with +1 by an adder AD1 to the least significant bit (LSB). The twos complement value is input to the terminal 1 of the selector SL1.

On the other hand, the input sign bit $IS_{00}$ is input to the selection control terminal S of the selector SL1. Hence, the input magnitude bits $I_{00}$ are output as they are from the selector SL1 when the input sign bit $IS_{00}=0$ (positive), and the twos complement value of the input magnitude bits $I_{00}$ are output from the selector SL1 when the input sign bit $IS_{00}=1$ (negative). As a result, the input correlation demodulated data $I_{00}$ are converted into an absolute value $|I_{00}|$.

The input correlation demodulated data $Q_{00}$ are similarly converted into an absolute value $|Q_{00}|$. Accordingly, the adder 58 adds the absolute values $|I_{00}|$ and $|Q_{00}|$, and outputs an absolute value sum correlation energy $E_{00}$ ($=|I_{00}|+|Q_{00}|$).

Figure 21:
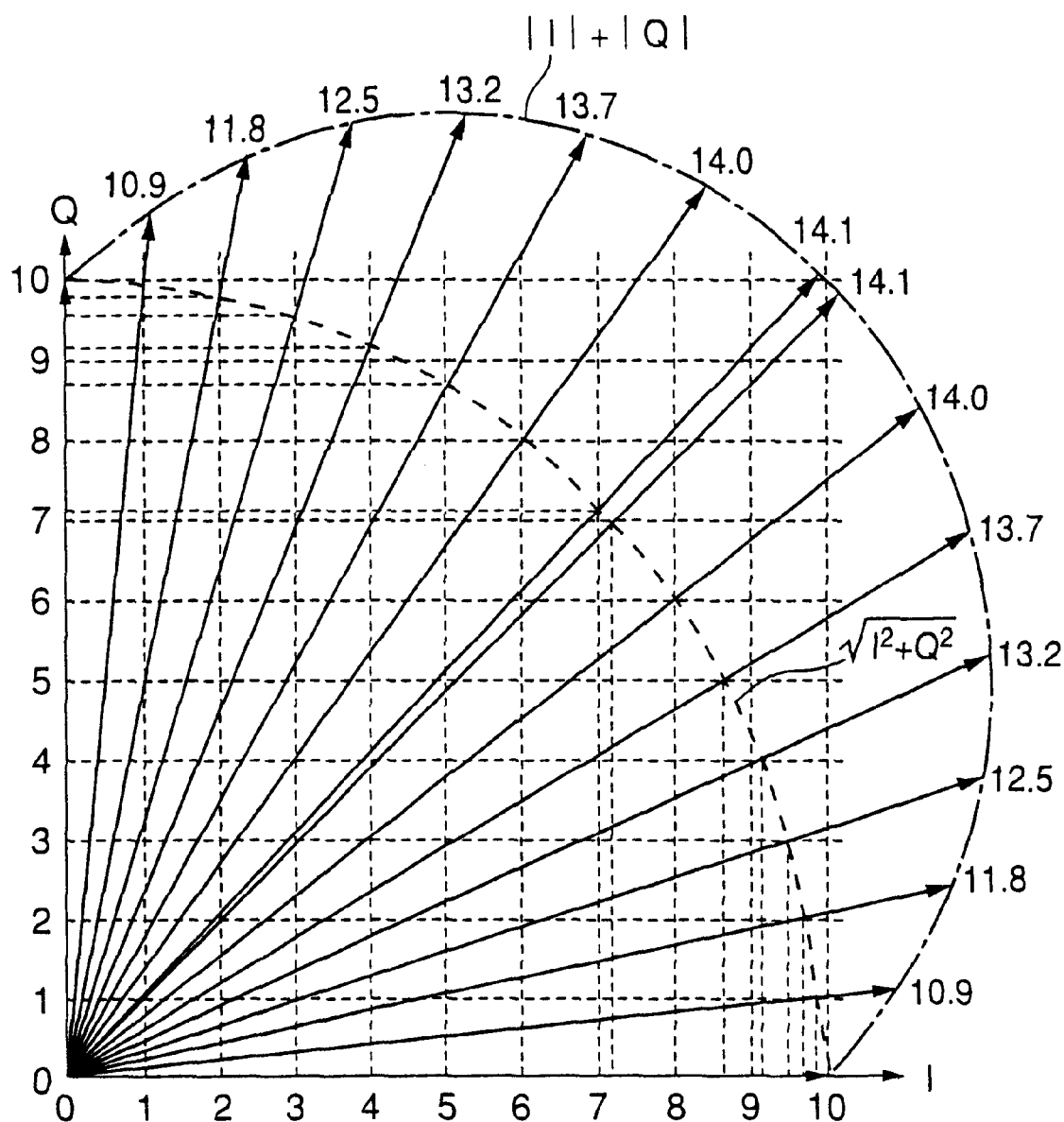
FIG. 21 is a diagram for explaining an absolute value sum correlation energy obtained in the third embodiment.

FIG. 21 is a diagram for explaining an absolute value sum correlation energy obtained in this third embodiment. FIG. 21 shows a case where a set of correlation demodulated data I and Q satisfying the root of sum-of-square correlation energy $E=\sqrt{(I^2+Q^2)}=10$ is described by the absolute value sum correlation energy $E=|I|+|Q|$. More particularly, $Q=\sqrt{(100-I^2)}$ is obtained for I=0 to 7, and each value of the absolute value sum correlation energy $E=|I|+|Q|$ is plotted on the I-Q plane. The data of the numerical values are shown below.

| I | Q | E = \|I\| + \|Q\| |
|---|-----|------|
| 0 | 10.0 | 10.0 |
| 1 | 9.9 | 10.9 |
| 2 | 9.8 | 11.8 |
| 3 | 9.5 | 12.5 |
| 4 | 9.2 | 13.2 |
| 5 | 8.7 | 13.7 |
| 6 | 8.0 | 14.0 |
| 7 | 7.1 | 14.1 |

Due to the symmetry of $I=\sqrt{(100-Q^2)}$ and $Q=\sqrt{(100-I^2)}$, results similar to those shown above are also obtained for Q=0 to 7.

As may be seen from FIG. 21, even with respect to a set of correlation demodulated data (I, Q) such that E becomes E=10 (constant) if described by the root of sum-of-square correlation energy $E=\sqrt{(I^2+Q^2)}$, when described by the absolute value sum correlation energy $E=|I|+|Q|$, $|I|+|Q|$ becomes $|I|+|Q|=10$ if (I, Q)=(0, 10), $|I|+|Q|=13.2$ if (I, Q)=(4.0, 9.2), and $|I|+|Q|=14.1$ if (I, Q)=(7.0, 7.1), for example, and does not become constant. In other words, depending on the correlation demodulation coordinates (I, Q) on the I-Q plane, a maximum error (deviation) of 4.1 occurs in the magnitude of the absolute value sum correlation energy E. Hence, it may be anticipated that this error (deviation) affects the maximum value detection accuracy of the absolute value sum correlation energy and the energy combining accuracy.

However, it is very advantageous from the point of view of providing a compact and inexpensive radio communication apparatus, to be able to replace the extremely large circuit scale (computation) required by the sum of squares correlation energy computing units $46_{00}$ through $46_{63}$ by the simple absolute value sum correlation energy computing units $55_{00}$ through $55_{63}$. Moreover, if it is possible to maintain a relatively good communication quality (Eb/No), it may be regarded that the substantial error of the absolute value sum correlation energy is sufficiently smaller than 4.1, because it may be regarded that a correlation demodulated data $(I_m, Q_m)$ which is closest to a received symbol (Walsh code signal) and a second closest correlation demodulated data $(I_n, Q_n)$ will not appear at extremely distant coordinates (phases) on the I-Q plane. Therefore, depending on the environment in which the radio equipment such as the radio communication apparatus is used, it may be seen that the maximum value detection accuracy obtainable based on the absolute value sum correlation energy is sufficient from the practical point of view.

If it is possible to make the curve of the absolute value sum correlation energy E approach a circular shape such that the error is zero on the locus, it is possible to further improve the accuracy of the maximum value detection and the energy combining. A description will now be given of an embodiment which enables such a further improvement.

Figure 22:
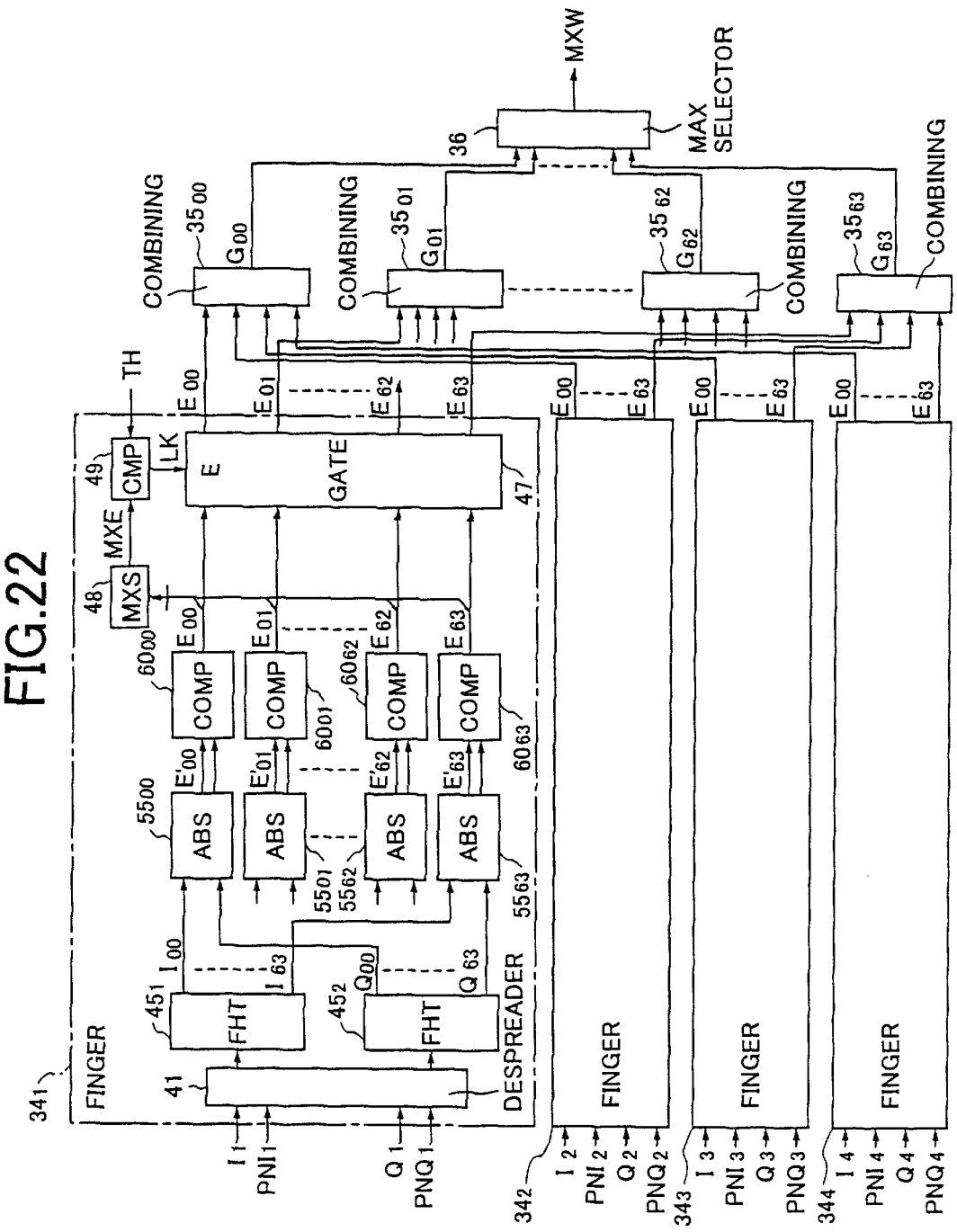
FIG. 22 is a system block diagram showing the construction of a part of a fourth embodiment of the radio communication apparatus according to the present invention.

FIG. 22 is a system block diagram showing the construction of a part of a fourth embodiment of the radio communication apparatus according to the present invention. This fourth embodiment corrects the error which appears in the absolute value sum correlation energies which will be denoted by $E'_{00}$ through $E'_{63}$ for the sake of convenience.

In FIG. 22, correction circuit sections (COMP) $60_{00}$ through $60_{63}$ are provided at a stage following the corresponding absolute value sum correlation energy computing units $55_{00}$ through $55_{63}$. Otherwise, the construction of this fourth embodiment is basically the same as that of the third embodiment shown in FIG. 19, except that the maximum value selector 48 in FIG. 22 uses the absolute value sum correlation energies $E_{00}$ through $E_{63}$ after the correction.

Figure 23:
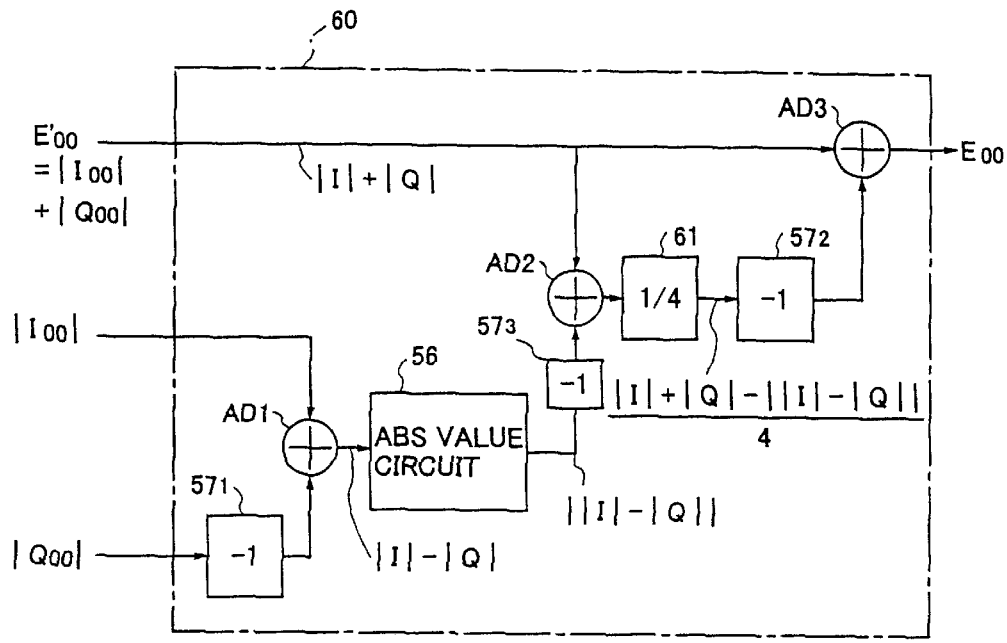
FIG. 23 is a system block diagram showing an embodiment of a correction circuit section of the fourth embodiment.
Figure 24:
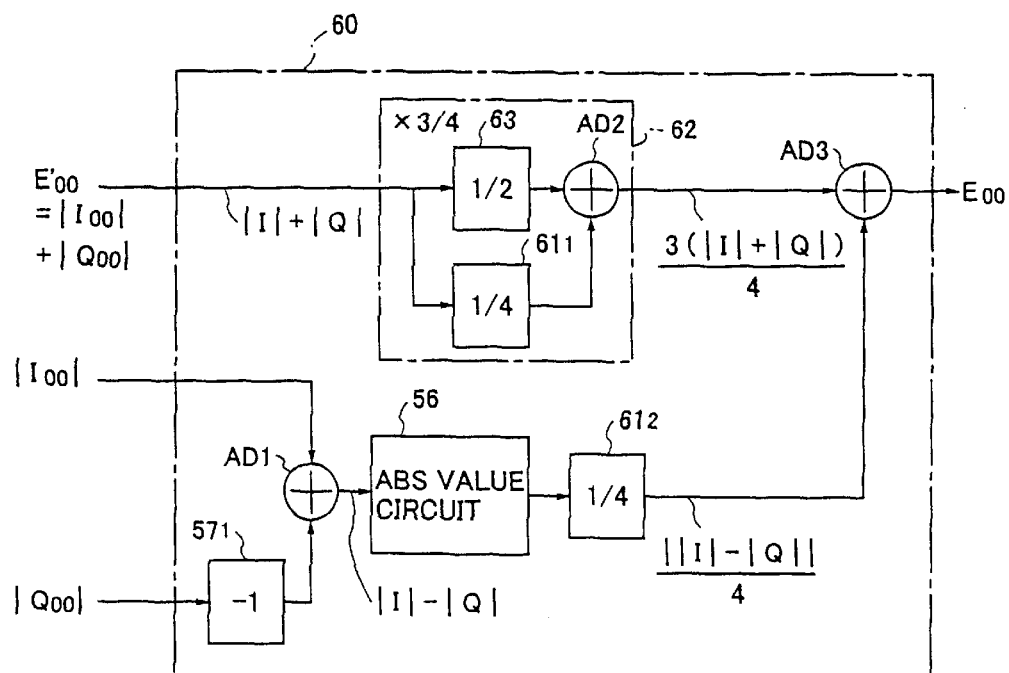
FIG. 24 is a system block diagram showing another embodiment of the correction circuit section of the fourth embodiment.
Figure 25:
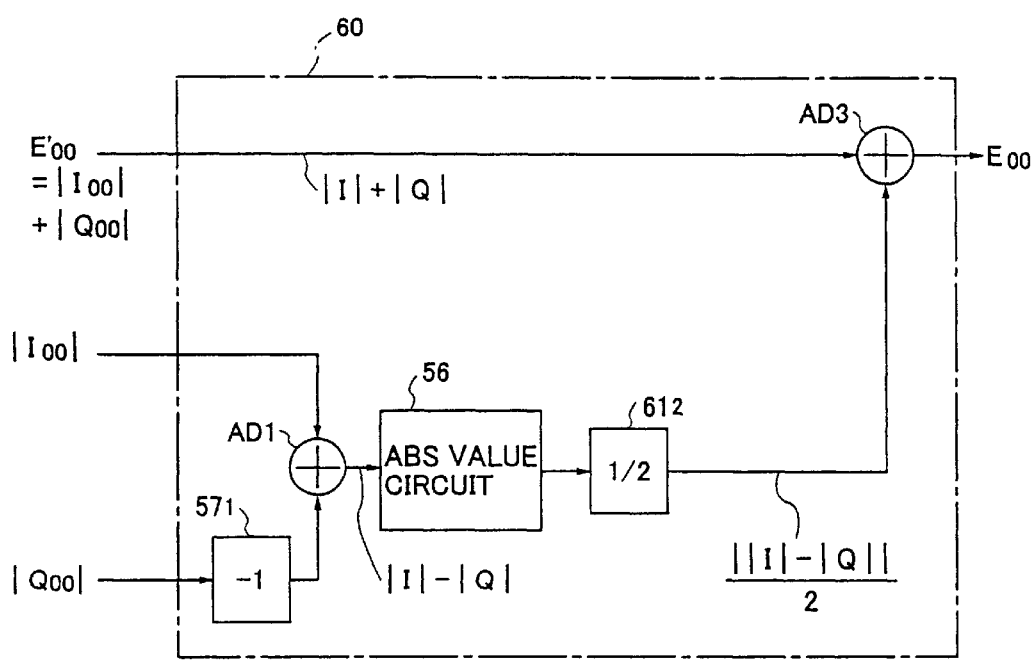
FIG. 25 is a system block diagram showing still another embodiment of the correction circuit section of the fourth embodiment.

FIG. 23 is a system block diagram showing an embodiment of a correction circuit section of this fourth embodiment, FIG. 24 is a system block diagram showing another embodiment of the correction circuit section of this fourth embodiment, and FIG. 25 is a system block diagram showing still another embodiment of the correction circuit section of this fourth embodiment. In addition, FIG. 26 is a diagram for explaining a corrected absolute value sum correlation energy obtained in this fourth embodiment, and FIG. 27 is a diagram for explaining another corrected absolute value sum correlation energy obtained in this fourth embodiment.

Figure 26:
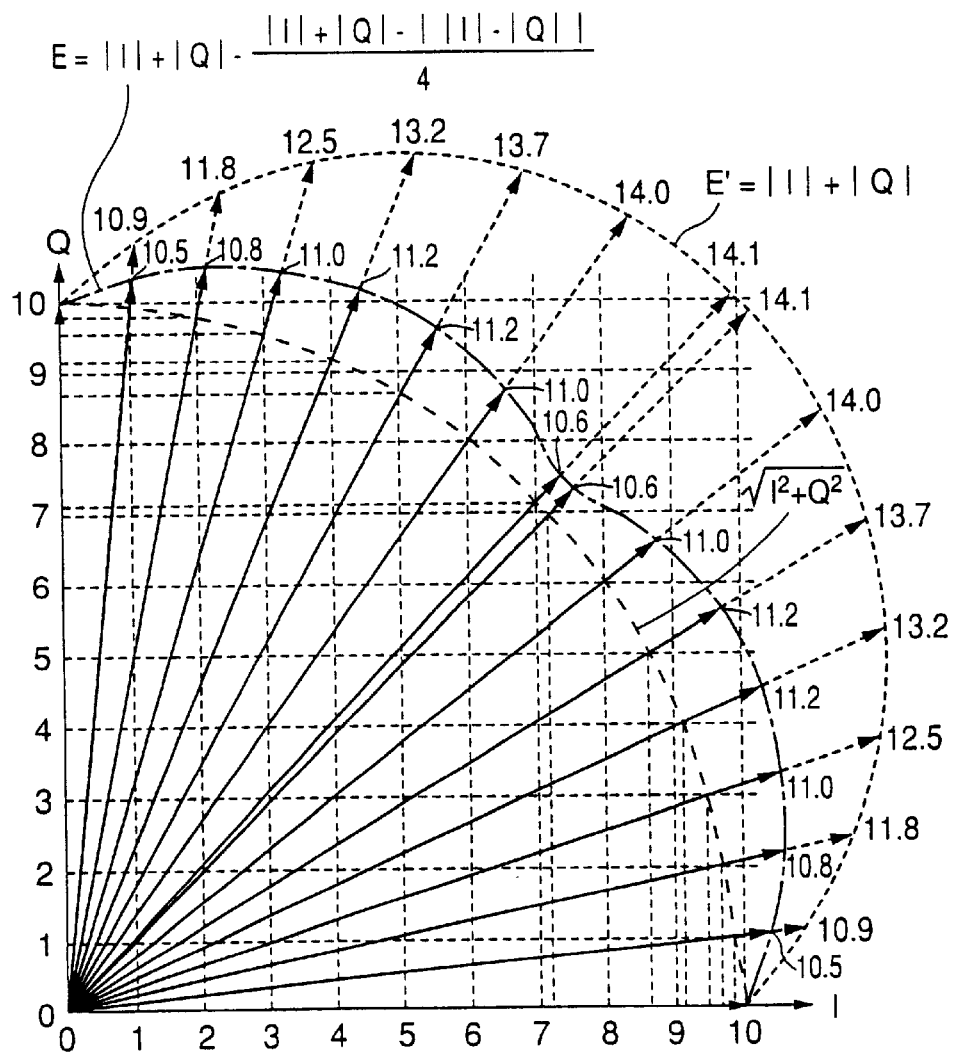
FIG. 26 is a diagram for explaining a corrected absolute value sum correlation energy obtained in the fourth embodiment.

FIG. 26 shows a case where the curve of the absolute value sum correlation energy ($|I|+|Q|$) is made to approach the curve (circle) of the sum of squares correlation energy $\{\sqrt{(I^2+Q^2)}\}$. In FIG. 26, the error between the sum of squares correlation energy $\{\sqrt{(I^2+Q^2)}\}$ and the absolute value sum correlation energy ($|I|+|Q|$) is largest when the correlation demodulation coordinates (I, Q) has an inclination of 45 degrees, that is, when $|I|=|Q|$. Accordingly, in order to correct this error, an approximated value with respect to the error is subtracted from the input absolute value sum correlation energy E'. In other words, the corrected absolute value sum correlation energy E is obtained from the following formula (1).

$$E=|I|+|Q|-(|I|+|Q|-||I|-|Q||)/4 \qquad (1)$$

According to the formula (1), $E=|I|+|Q|-(|I|+|Q|)/4$ if $|I|=|Q|$. Furthermore, the relationship $E=3(|I|+|Q|)/4=1.5|I|$ (or $1.5|Q|$)$\approx\sqrt{2}|I|$ (or $\approx\sqrt{2}|Q|$) stands. Hence, approximately the same values can be obtained as in the case of the root of sum-of-square correlation energies, and the values perfectly match the values of sum of squares correlation energies.

The values of the corrected absolute value sum correlation energy E obtained from the formula (1) are plotted in FIG. 26. According to FIG. 26, the error of the corrected absolute value sum correlation energy E is only 1.2 (=11.2−10) at the maximum. It should be noted that, the purpose of carry out the correction in this embodiment is not necessarily to match the absolute value sum correlation energy E to the root of sum-of-square correlation energy, but is to make the error of the locus of the absolute value sum correlation energy itself approach zero. In other words, the purpose of the correction is to reduce the non-circular degree of the locus of the absolute value sum correlation energy so as to make the locus approach the circular shape. By carrying out the correction, it is possible to further improve the maximum value detection accuracy and the energy combining accuracy, as compared to the case where no correction is made.

FIG. 23 shows the embodiment of the correction circuit section 60 which uses the formula (1). An adder AD1 generates |I|−|Q| by subtracting the input |Q| from the input |I|, since the input |Q| is inverted by an inverter 571. An absolute value circuit 56 generates an absolute value ||I|−|Q|| from the output of the adder AD1. An adder AD2 generates |I|+|Q|−||I|−|Q|| by subtracting ||I|−|Q|| from |I|+|Q|, since the output of the absolute value circuit 56 is inverted by an inverter 573. A ¼ divider 61 divides the output of the adder AD2 by 4, and generates (|I|+|Q|−||I|−|Q||)/4. The ¼ divider 61 may be formed by a simple circuit and wiring, so as to shift the output data of the adder AD2 by 2 bits in the LSB direction. The output of the ¼ divider 61 is inverted by an inverter 572 and supplied to an adder AD3. Hence, the adder AD3 generates a final corrected absolute value sum correlation energy E by subtracting the correction value (|I|−|Q|−||I|−|Q||)/4 from the input absolute value sum correlation energy E'=|I|+|Q|.

When the formula (1) is developed, it is possible to obtain the following formula (2).

$$E = 3(|I|+|Q|)/4 + (||I|-|Q||)/4 \quad (2)$$

What the formula (2) means, is that the corrected curve shown in FIG. 26 can be realized by the correction circuit section 60 having a construction other than that shown in FIG. 23.

FIG. 24 shows the other embodiment of the correction circuit section 60 which uses the formula (2). An adder AD1 generates |I|−|Q| by subtracting the input |Q| from the input |I|, since the input |Q| is inverted by an inverter 571. An absolute value circuit 56 generates an absolute value ||I|−|Q|| from the output of the adder AD1. A ¼ divider 612 divides the output of the absolute value circuit by 4, and generates (||I|−|Q||)/4 which is supplied to an adder AD3. On the other hand, a ¾ multiplier 62 includes a ½ divider 63, a ¼ divider 611, and an adder AD2 which are connected as shown. Hence, the ¾ multiplier 62 generates 3(|I|+|Q|)/4 from the input absolute value sum correlation energy E'=|I|+|Q|. The output of the ¾ multiplier 62 is supplied to the adder AD3. Hence, the adder AD3 generates a final corrected absolute value sum correlation energy E by subtracting the correction value (||I|−|Q||)/4 from 3(|I|+|Q|)/4.

Figure 27:
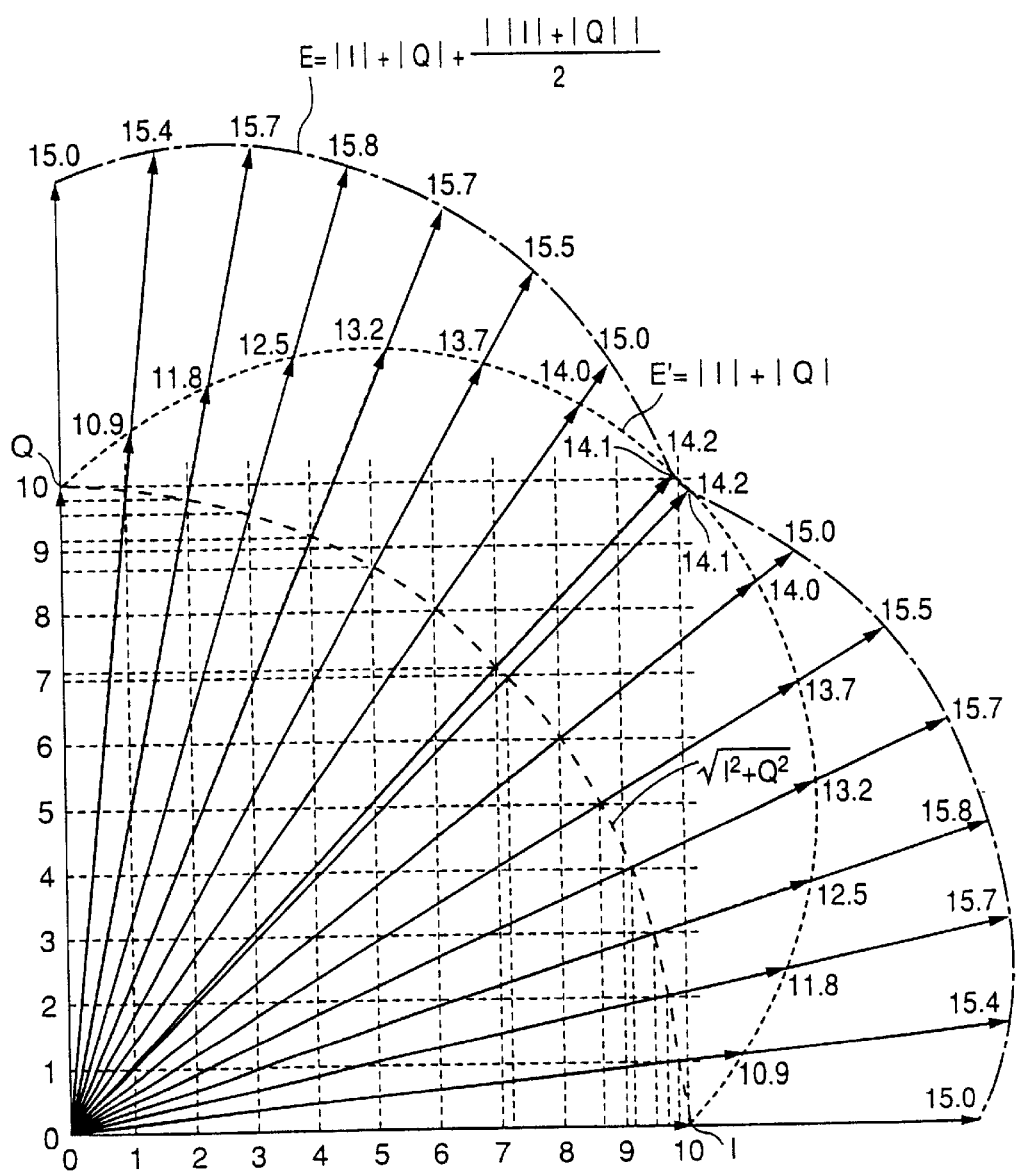
FIG. 27 is a diagram for explaining another corrected absolute value sum correlation energy obtained in the fourth embodiment.

FIG. 27 shows a case where the input absolute value sum correlation energy E'=|I|+|Q| is corrected in a direction opposite to that of FIG. 26, that is, in a direction so as to match the radius of the approximate circle to the magnitude corresponding to the inclination of 45 degrees. As described above, as long as the curve of the absolute value sum correlation energy after the correction approaches the circle, the purpose of the correction is achieved regardless of the radius. Hence, it is assumed in this case that an approximated value with respect to the error is added with respect to the input absolute value sum correlation energy E'. In other words, the corrected absolute value sum correlation energy E is obtained from the following formula (3).

$$E = |I| + |Q| + (||I|-|Q||)/2 \quad (3)$$

According to the formula (3), E=|I|+|Q| if |I|=|Q|. Furthermore, the relationship E=3|I|/2 (or =3|Q|/2) =1.5|I| (or 1.5|Q|) ≈√2|I| (or ≈√2|Q|) stands if |I|=0 or |Q|=0. The values of the corrected absolute value sum correlation energy E obtained from the formula (3) are plotted in FIG. 27. According to FIG. 27, the error (deviation) of the corrected absolute value sum correlation energy E is only 1.5 (=15/7−14.2) at the maximum. Accordingly, it is possible to further improve the maximum value detection accuracy and the energy combining energy as compared to the case where no correction is made.

FIG. 25 shows still the other embodiment of the correction circuit section 60 which uses the formula (3). An adder AD1 generates |I|−|Q| by subtracting the input |Q| from the input |I|, since the input |Q| is inverted by an inverter 571. An absolute value circuit 56 generates an absolute value ||I|−|Q|| from the output of the adder AD1, and a ½ divider 612 divides the output of the absolute value circuit 56, so as to supply a correction value (||I|−|Q||)/2 to an adder AD3. Hence, the adder AD3 generates a final corrected absolute value sum correlation energy E by adding the correction value (||I|−|Q||)/2 to the input absolute value sum correlation energy E'=|I|+|Q|.

Figure 28:
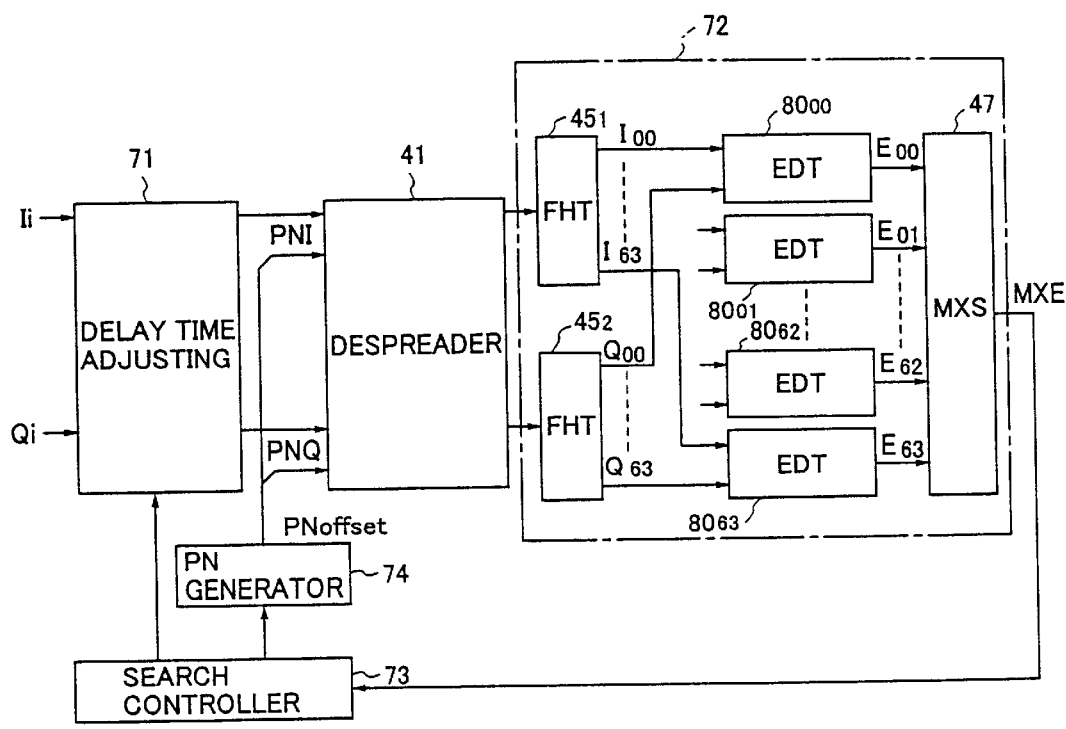
FIG. 28 is a system block diagram showing the construction of a searcher.

FIG. 28 is a system block diagram showing the construction of a searcher. FIG. 28 shows a case where this embodiment is applied to the searcher 40 which employs the correlation energy detection system. In FIG. 28, a correlation energy detector 72 is provided with energy detectors (EDT) $80_{00}$ through $80_{63}$ for detecting the root of sum-of-square correlation energies, the absolute value sum correlation energies or the corrected absolute value sum correlation energies according to any of the embodiments described above, in place of the conventional sum of squares correlation energy computing units $46_{00}$ through $46_{63}$. Generally, the accuracy demanded of the searcher 40 is not as severe as that demanded of the finger 34. Hence, even in a case where the structure is simple using only the absolute value sum correlation energy computing unit 55 of the third embodiment, for example, it is still possible to carry out a satisfactory search control.

In the fourth embodiment described above, three embodiments of the correction circuit section 60 are shown. However, other embodiments of the correction circuit section 60 are possible as long as the error of the absolute value sum correlation energy is corrected towards zero or, the curve is made to approach a circle.

Of course, the present invention is not limited to the numerical values described in each of the embodiments described above.

Further, the present invention is not limited to these embodiments, but various variations and modifications may be made without departing from the scope of the present invention.

What is claimed is:

1. A radio communication apparatus which subjects each signal series which is described by I-Q orthogonal components and is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, wherein:

each finger includes a correlation energy detector so as to obtain the correlation values of the codes, a maximum value selector, and a gate section, said correlation energy detector detecting a magnitude of a correlation between a first signal series ($I_i$, $Q_i$) described by I-Q orthogonal components and a predetermined second signal series ($H_j$) when carrying out a despreading in a code division multiple access (CDMA) system, and comprising:

correlation computing means for computing correlation values ($I_{ij}$, $Q_{ij}$) between the first signal series (I, $Q_i$) and the predetermined second signal series ($H_j$), said first signal series ($I_i$, $Q_i$) being a spread code; and root computing means for computing $\{\sqrt{(I_{ij}^2+Q_{ij}^2)}\}$ as a root value of a sum of squares of the correlation values ($I_{ij}$, $Q_{ij}$) obtained from the correlation computing means, said maximum value selector selectively outputting a largest $\{\sqrt{(I_{ij}^2+Q_{ij}^2)}\}$ value computed by said root computing means belonging to the same finger as said maximum value selector, said gate section outputting the $\{\sqrt{(I_{ij}^2+Q_{ij}^2)}\}$ values computed by said root computing means belonging to the same finger as said gate section when the largest $\{\sqrt{(I_{ij}^2+Q_{ij}^2)}\}$ value exceeds a threshold value, for use in obtaining the combined values.

2. A radio communication apparatus which subjects each signal series which is described by I-Q orthogonal components and is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, said radio communication apparatus comprising:

a searcher which monitors a reception state by obtaining the correlation values of the codes for each path, and performs a path selection and a delay time adjustment with respect to each finger, said searcher including a correlation energy detector so as to obtain the correlation values of the codes, a maximum value selector, and a gate section, said correlation energy detector detecting a magnitude of a correlation between a first signal series ($I_i$, $Q_i$) described by I-Q orthogonal components and a predetermined second signal series ($H_j$) when carrying out a despreading in a code division multiple access (CDMA) system, and comprising:

correlation computing means for computing correlation values ($I_{ij}$, $Q_{ij}$) between the first signal series (I, $Q_i$) and the predetermined second signal series ($H_j$), said first signal series ($I_i$, $Q_i$) being a spread code; and absolute value sum computing means for computing ($|I_{ij}|+|Q_{ij}|$) as a sum of absolute values of the correlation values ($I_{ij}$, $Q_{ij}$) obtained from the correlation computing means, said maximum value selector selectively outputting a largest $\{\sqrt{(I_{ij}^2+Q_{ij}^2)}\}$ value computed by said absolute value sum computing means belonging to the same finger as said maximum value selector, said gate section outputting the $\{\sqrt{(I_{ij}^2+Q_{ij}^2)}\}$ values computed by said absolute value sum computing means belonging to the same finger as said gate section when the largest $\{\sqrt{(I_{ij}^2+Q_{ij}^2)}\}$ value exceeds a threshold value, for use in obtaining the combined values.

3. A radio communication apparatus which subjects each signal series which is described by I-Q orthogonal components and is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, wherein:

each finger includes a correlation energy detector so as to obtain the correlation values of the codes, a maximum value selector, and a gate section, said correlation energy detector detecting a magnitude of a correlation between a first signal series ($I_i$, $Q_i$) described by I-Q orthogonal components and a predetermined second signal series ($H_j$) when carrying out a despreading in code division multiple access (CDMA) system, and comprising:

a correlation computing unit to compute correlation values ($I_{ij}$, $Q_{ij}$) between the first signal series ($I_i$, $Q_i$) and the predetermined second signal series ($H_j$), said first signal series ($I_i$, $Q_i$) being a spread code; and a root computing unit to compute $\{\sqrt{(I_{ij}^2+Q_{ij}^2)}\}$ as a root value of a sum of squares of the correlation values ($I_{ij}$, $Q_{ij}$) obtained from the correlation computing unit, said maximum value selector selectively outputting a largest $\{\sqrt{(I_{ij}^2+Q_{ij}^2)}\}$ value computed by said root computing unit belonging to the same finger as said maximum value selector, said gate section outputting the $\{\sqrt{(I_{ij}^2+Q_{ij}^2)}\}$ values computed by said root computing unit belonging to the same finger as said gate section when the largest $\{\sqrt{(I_{ij}^2+Q_{ij}^2)}\}$ value exceeds a threshold value, for use in obtaining the combined values.

4. A radio communication apparatus which subjects each signal series which is described, by I-Q orthogonal components and is received via a multi-path and demodulated, to a Hadamard transform at each of fingers, by use of an M-ary quadrature coding scheme, obtains correlation values of codes, combines correlation values output from fingers which obtain valid correlation values, and demodulates a received signal based on a maximum correlation value of combined correlation values, said radio communication apparatus comprising:

a searcher to monitor a reception state by obtaining the correlation values of the codes for each path, and to perform a path selection and a delay time adjustment with respect to each finger, said searcher including a correlation energy detector so as to obtain the correlation values of the codes, a maximum value selector, and a gate section, said correlation energy detector detecting a magnitude of a correlation between a first signal series ($I_i$, $Q_i$) described by I-Q orthogonal components and a predetermined second signal series ($H_j$) when carrying out a despreading in a code division multiple access (CDMA) system, and comprising:

a correlation computing means for computing correlation values ($I_{ij}$, $Q_{ij}$) between the first signal series ($I_i$, $Q_i$) and the predetermined second signal series ($H_j$) said first signal series (Ii, Qi) being a spread code; and an absolute value sum computing unit to compute ($|I_{ij}|+|Q_{ij}|$) as a sum of absolute values of the correlation values ($I_{ij}$, $Q_{ij}$) obtained from the correlation computing unit, said maximum value selector selectively outputting largest $\{\sqrt{(I_{ij}^2+Q_{ij}^2)}\}$ values computed by said absolute value sum computing unit belonging to the same finger as said maximum value selector, said gate section outputting the $\{\sqrt{(I_{ij}^2+Q_{ij}^2)}\}$ values computed by said absolute value sum computing unit belonging to the same finger as said gate section when the largest $\{\sqrt{(I_{ij}^2+Q_{ij}^2)}\}$ value exceeds a threshold value, for use in obtaining the combined values.

* * * * *